United States Patent
Kusunose et al.

(10) Patent No.: US 7,916,161 B2
(45) Date of Patent: Mar. 29, 2011

(54) IMAGE FORMING APPARATUS

(75) Inventors: Noboru Kusunose, Kanagawa (JP); Kazunori Bannai, Kanagawa (JP); Iwao Matsumae, Tokyo (JP); Yoshinobu Sakaue, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 919 days.

(21) Appl. No.: 11/672,798

(22) Filed: Feb. 8, 2007

(65) Prior Publication Data
US 2007/0188589 A1  Aug. 16, 2007

(30) Foreign Application Priority Data

Feb. 13, 2006 (JP) ................. 2006-035091
Feb. 17, 2006 (JP) ................. 2006-040826

(51) Int. Cl.
*G02B 26/10* (2006.01)
*B41J 2/44* (2006.01)
(52) U.S. Cl. ........................ 347/116; 347/234
(58) Field of Classification Search .............. 347/233, 347/234, 235, 237, 247, 248, 249, 116; 399/298, 399/299, 300, 301
See application file for complete search history.

(56) References Cited

U.S. PATENT DOCUMENTS

| | | | |
|---|---|---|---|
| 6,697,092 B2 | 2/2004 | Bannai |
| 6,786,590 B2 | 9/2004 | Maki et al. |
| 6,836,633 B2 | 12/2004 | Bannai et al. |
| 6,891,559 B1 | 5/2005 | Bannai |
| 2003/0161012 A1 | 8/2003 | Kusunose |
| 2004/0100550 A1 | 5/2004 | Bannai et al. |
| 2004/0263603 A1 | 12/2004 | Maki et al. |
| 2005/0174418 A1 | 8/2005 | Sakaue et al. |
| 2006/0055769 A1 | 3/2006 | Yamazaki et al. |

FOREIGN PATENT DOCUMENTS

| | | |
|---|---|---|
| JP | 3087748 | 7/2000 |
| JP | 2001-253113 | 9/2001 |
| JP | 2003-94719 | 4/2003 |
| JP | 2004-174720 | 6/2004 |
| JP | 2004-191847 | 7/2004 |
| JP | 2004-287380 | 10/2004 |

*Primary Examiner* — Huan H Tran
(74) *Attorney, Agent, or Firm* — Oblon, Spivak, McClelland, Maier & Neustadt, L.L.P.

(57) ABSTRACT

An image forming apparatus is provided with a light scanning device that directs laser beams emitted from a plurality of laser light sources on to a plurality of photoconductive members via focusing device which includes optical elements and a deflecting device that deflects the beams in a main scanning direction; an image forming device which forms visible images of different colors from images written onto the photoconductive members by the light scanning device; and an intermediate transfer member or a recording sheet transport member capable of carrying the visible images formed on the photoconductive members. When in detection mode, a control device controls the correction of color registration errors between each color forms patterns on an intermediate belt by an image forming device, detects the patterns by a color registration error detection sensor, and stores the color registration error correction values obtained from the detection output of the sensor in a memory device. When forming images, the control device reads the color registration error correction values stored in the memory device, and carries out correction in accordance with the correction values via a writing start position correction device which deflects the laser position in the sub scanning direction.

13 Claims, 20 Drawing Sheets

FIG. 4
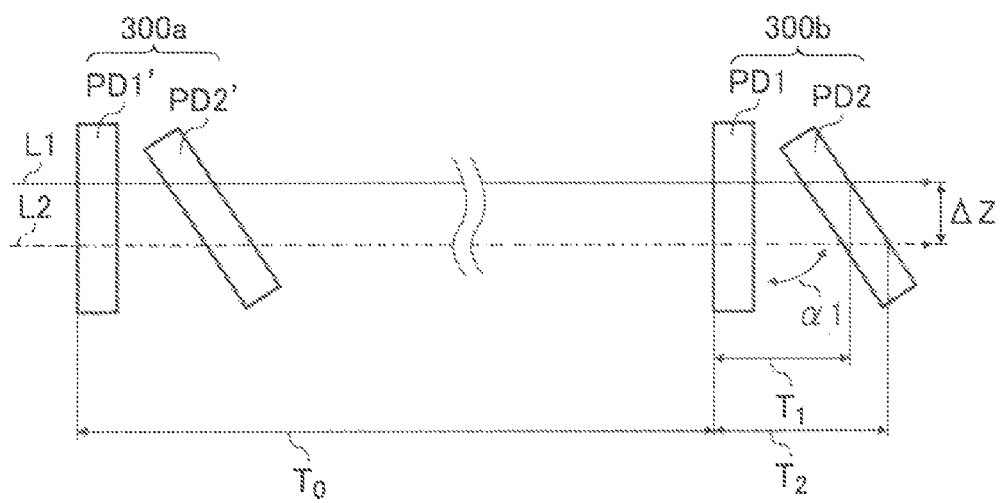
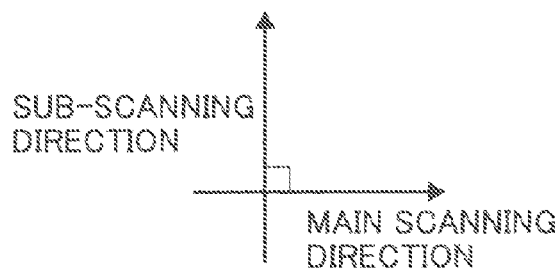

IMAGE FORMING APPARATUS

BACKGROUND OF THE INVENTION

1. Field of the Invention

The present invention relates to an image forming apparatus including a light scanning device which directs light beams emitted from a plurality of laser light sources onto photoconductive members via an image focusing device having optical elements and a deflection device which deflects the light in a main scanning direction; an image forming device which forms visible images of different colors from the images written onto a plurality of photoconductive members by the light scanning device; and an intermediate transfer member or recording sheet transport member that can support the visible images formed on the photoconductive members.

2. Description of the Background Art

In a tandem type image forming apparatus that forms images of each color at the same time using a single polygon motor, registration adjustment is carried out between colors to prevent reduction in image quality due to color registration errors. The timing of this registration adjustment is at the time of writing, so it is only possible to adjust at scan time intervals of one face of the polygon mirror, so there is a possibility of occurrence of a maximum of one line of color registration error.

Also, in recent years it has been necessary to reduce the cost of the light scanning device, so plastic has been adopted instead of die casting, so the use of resin forming has become essential. In particular, the number of components in the optical elements of the tandem type writing unit is large, so the cost reduction effect of changing to plastic is very large, so plastic has been adopted for forming the optical elements. However, bending can easily occur in the long direction of long plastic optical elements, in particular in the direction normal to the main scanning direction. This bending is several tens of microns, and due to differences in the molds the magnitude and direction of the bending varies. Hence it was very difficult to align between each of the stations with high accuracy scan lines with bending and inclination. For example, if the bending in one color is 30 µm and this color is set to be the standard color, even if the other colors are aligned to the bending a maximum of 60 µm registration error occurs. Also, when an actual image is output, curvature is produced at the transfer unit, photoconductive member, and so on, so even if color registration errors are eliminated from the writing unit, color registration errors can still occur. This type of color registration error can occur while operating, and cause deterioration of the image quality.

Therefore, in for example Japanese Patent Application Laid-open No. 2004-287380 the beam position in the sub scanning direction is detected, and inclination or bending of the image is dealt with by inclining or bending the scan lens. However, correction of color registration errors after carrying out the color registration error detection operation is not clearly described.

Furthermore, in this Japanese Patent Application Laid-open No. 2004-287380 technology is disclosed for correcting scan line bending by scan line bending correction means provided in the retaining member that supports the optical elements. However, in this conventional art one of the four colors is the standard, and the scan position of the scan beams of the colors apart from the standard are corrected to substantially coincide with the scan position of the standard color. Therefore if the scan line bending of the standard color increased due to thermal deformation, the correction deviation to the standard color may become too large.

Also, in Japanese Patent Application Laid-open No. 2004-174720, a light exposure device is disclosed that includes a light source and an optical scanning system that deflects and reflects the light beam emitted from the light source towards a light exposure member as well as scanning the light exposure member. Specifically, the light exposure device includes a deflecting member disposed in the light path formed by the light scanning system, and control means connected to the deflecting member that control the deflection of the light beam deflected by the deflecting member. The deflecting member deflects the light beam emitted from the light scanning system towards the light exposure member. The control means measures the amount of positional deviation between electrostatic latent images when electrostatic latent images are formed on different light exposure members, and controls the deflection of the light beam by the deflecting member based on the amount of positional deviation. However, this device cannot respond to the deviation of laser beam irradiation position caused by the heat generated by a motor such as a polygon motor.

Also, in Japanese Patent Application Laid-open No. 2003-94719, a mechanism that carries out registration adjustment to one line or less in the sub scanning direction by rotating an LD light source is disclosed. However, this does not deal with correcting inclination or bending.

Furthermore, in Japanese Patent Application Laid-open No. 2001-253113 and Japanese Patent No. 3087748, technology is disclosed for detecting the beam position in the sub scanning direction. However, this conventional art does not deal with inclination and bending with one line registration adjustment.

In this way, registration between colors, scan line inclination between colors, and scan line bending between colors due to variations in the scan position of the laser beam can cause color registration errors which cause image deterioration. It has been difficult for conventional art to correct these errors with high accuracy.

SUMMARY OF THE INVENTION

With the foregoing conventional problems in view, it is an object of the present invention to provide an image forming apparatus capable of correcting color registration errors caused by scan line bending and the like, so that good image quality can be obtained.

It is another object of the present invention to provide an image forming apparatus capable of obtaining a higher measurement accuracy and correction accuracy.

In an aspect of the present invention, an image forming apparatus comprises a light scanning device that directs laser beams emitted from a plurality of laser light sources onto a plurality of photoconductive members via a focusing device and a deflecting device which deflects the beams in a main scanning direction; an image forming device which forms visible images from images written onto the photoconductive members by the light scanning device; an intermediate transfer member or a recording sheet transport member capable of carrying the visible images formed on the photoconductive members; a sub scan deflecting device which deflects the position of the laser beams irradiated onto the photoconductive members in a sub scanning direction; a pattern detection device which detects a pattern formed on the intermediate transfer member or the recording sheet transport member by the image forming device; a memory device which stores color registration error correction values obtained from a detection output of the pattern detection device; and a control device which controls the correction of color registration errors between each color. When in detection mode, the control device forms a pattern on the intermediate transfer member or the recording sheet transport member by the image forming device, detects the pattern by the pattern detection device, and stores the color registration error correction values obtained from the detection output of the pattern detection device in the memory device. When forming images, the control device reads the color registration error correction values stored in the memory device, and carries out correction in accordance with the correction values via the sub scan deflecting device.

In another aspect of then present invention, an image forming apparatus comprises a light scanning device which directs laser beams emitted from a plurality of laser light sources onto a plurality of photoconductive members via a focusing device and a deflecting device which deflects the beams in a main scanning direction; an image forming device which forms visible images from images written onto the photoconductive members by the light scanning device; an intermediate transfer member or a recording sheet transport member capable of carrying the visible images formed on the photoconductive members; a sub scan deflecting device which deflects the position of the laser beams irradiated onto the photoconductive members in a sub scanning direction; a sub scan position detection device which detects the sub scan position of the laser beams irradiated onto the photoconductive members; a pattern detection device which detects a pattern formed on the intermediate transfer member or the recording sheet transport member by the image forming device; a memory device which stores a target irradiation position obtained by correcting color registration errors with respect to the laser irradiation position detected by the sub scan position detection device and color registration error correction values obtained from a detection output of the pattern detection device; and a control device which controls the correction of color registration errors between each color. The control device stores the target irradiation position detected by the sub scan position detection device in the memory means, and when in detection mode, forms a pattern on the intermediate transfer member or the recording sheet transport member by the image forming device, detects the pattern by the pattern detection device, and stores the color registration error correction values obtained from the detection output of the pattern detection device in the memory device. When forming images, the control device reads the color registration error correction values and the target irradiation position stored in the memory device, and carries out control so that the laser irradiation position after correction in accordance with the correction values is the target irradiation position.

In another aspect of the present invention, an image forming apparatus comprises a light scanning device that directs laser beams emitted from a plurality of laser light sources onto a plurality of photoconductive members via a focusing device which includes optical elements and a deflecting device which deflects the beams in a main scanning direction; an image forming device which forms visible images of different colors from images written onto the photoconductive members by the light scanning device; an intermediate transfer member or a recording sheet transport member capable of carrying the visible images formed on the photoconductive members; a sub scan deflecting device which deflects the position of the laser beams irradiated onto the photoconductive members in a sub scanning direction; a pattern detection device which detects a color registration error detection pattern formed on the intermediate transfer member or the recording sheet transport member by the image forming device; a memory device which stores scan line data and scan line bending correction values obtained from a detection output of the pattern detection device; and a control device which controls the correction of scan line bending between each color. When in detection mode, the control device forms a color registration error detection pattern on the intermediate transfer member or the recording sheet transport member by the image forming device, sets the scan line from among the plurality of scan lines obtained by the detection by the pattern detection device for the color that passes through the optical element that is most distant from the deflecting device, as a most distant standard scan line, stores data for the most distant standard scan line and bending correction values for the scan lines of other colors with respect to the standard scan line in the memory device. When forming images, the control device reads the data for the most distant standard scan line and the bending correction values for the scan lines of the other colors stored in the memory device, and carries out correction so that the laser irradiation position in the sub scanning direction coincides with the standard scan line in accordance with the correction values via the sub scan deflecting device.

In another aspect of the present invention, an image forming apparatus comprises a light scanning device that directs laser beams emitted from a plurality of laser light sources onto a plurality of photoconductive members via a focusing device which includes optical elements and a deflecting device which deflects the beams in a main scanning direction; an image forming device which forms visible images of different colors from images written onto the photoconductive members by the light scanning device; an intermediate transfer member or a recording sheet transport member capable of carrying the visible images formed on the photoconductive members; a sub scan deflecting device which deflects the position of the laser beams irradiated onto the photoconductive members in a sub scanning direction; a pattern detection device which detects a color registration error detection pattern formed on the intermediate transfer member or the recording sheet transport member by the image forming device; a memory device which stores scan line data and scan line bending correction values obtained from a detection output of the pattern detection device; and a control device which controls the correction of scan line bending between each color. When in detection mode, the control device forms a color registration error detection pattern on the intermediate transfer member or the recording sheet transport member by the image forming device, sets the scan line from among the plurality of scan lines obtained by the detection by the pattern detection device for which the bending deviation is the smallest, as a smallest standard scan line, stores data for the smallest standard scan line and bending correction values for other scan lines with respect to the standard scan line in the memory device. When forming images, the control device reads the data for the smallest standard scan line and the bending correction values for the other scan lines stored in the memory device, and carries out correction so that the laser irradiation position in the sub scanning direction coincides with the standard scan line in accordance with the correction values via the sub scan deflecting device.

In another aspect of the present invention, an image forming apparatus comprises a light scanning device that directs laser beams emitted from a plurality of laser light sources onto a plurality of photoconductive members via a focusing device which includes optical elements and a deflecting device which deflects the beams in a main scanning direction; an image forming device which forms visible images of different colors from images written onto the photoconductive members by the light scanning device; an intermediate transfer member or a recording sheet transport member capable of carrying the visible images formed on the photoconductive members; a sub scan deflecting device which deflects the position of the laser beams irradiated onto the photoconductive members in a sub scanning direction; a pattern detection device which detects a color registration error detection pattern formed on the intermediate transfer member or the recording sheet transport member by the image forming device; a memory device which stores scan line data and scan line bending correction values obtained from a detection output of the pattern detection device; and a control device which controls the correction of scan line bending between each color. When in detection mode, the control device forms a color registration error detection pattern on the intermediate transfer member or the recording sheet transport member by the image forming device, sets the scan line whose bending value is intermediate between the maximum value and the minimum value of bending of all the scan lines, as an imaginary standard scan line, stores data for the imaginary standard scan line and bending correction values for the scan lines of all colors with respect to the standard scan line in the memory device. When forming images, the control device reads the data for the imaginary standard scan line and the bending correction values for the scan lines of all colors stored in the memory device, and corrects the laser irradiation position in the sub scanning direction in accordance with the correction values via the sub scan deflecting device.

BRIEF DESCRIPTION OF THE DRAWINGS

The above and other objects, features, and advantages of the present invention will become more apparent from the following detailed description taken with the accompanying drawings, in which:

FIG. 4 is a diagram explaining the measurement principle of a non-parallel photodiode sensor as the beam spot position detection means;

DESCRIPTION OF THE PREFERRED EMBODIMENTS

The following is a detailed explanation of the present invention with reference to the drawings.

First Embodiment

Figure 1:
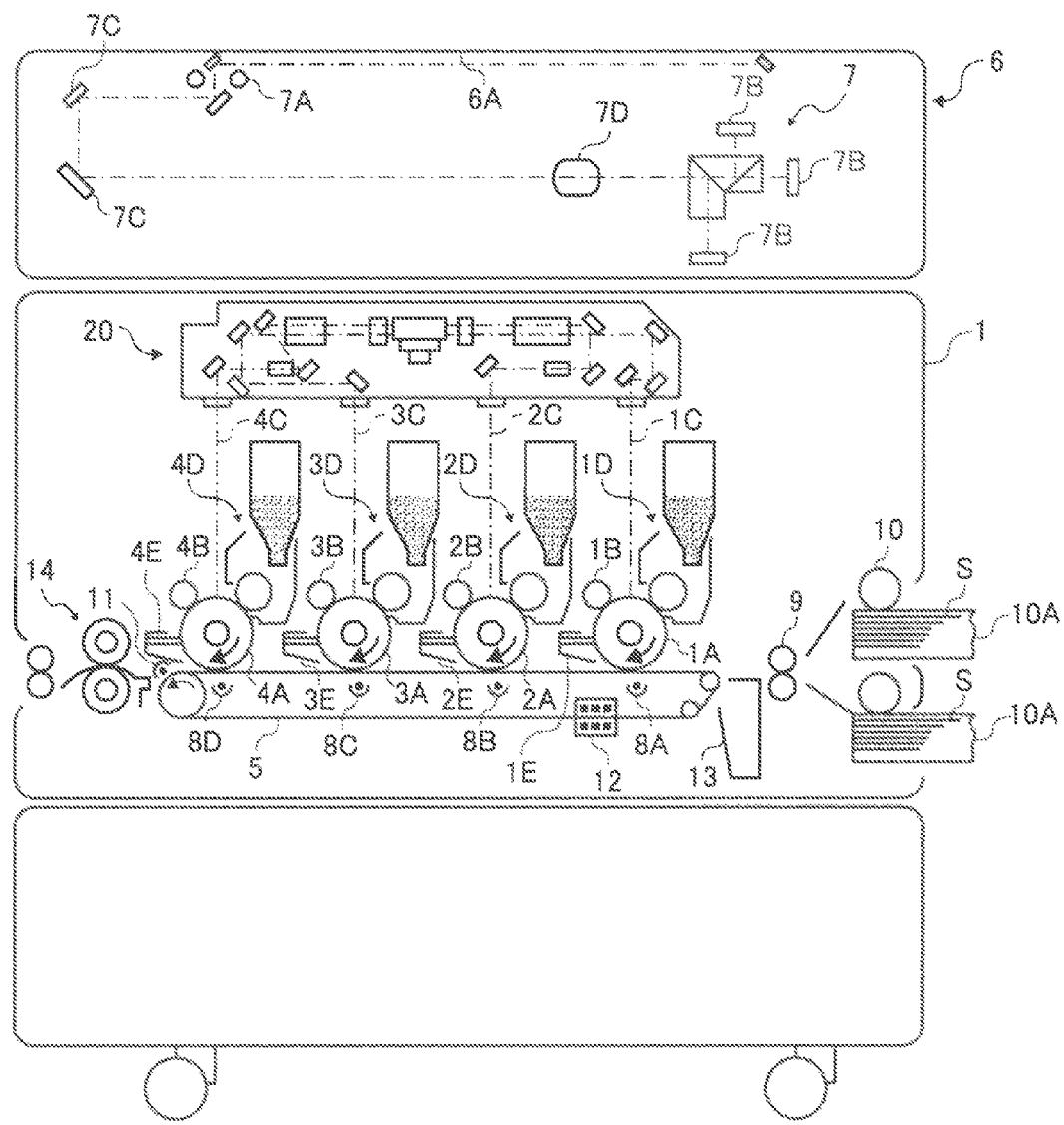
FIG. 1 is a side view showing the outline of an image forming apparatus according to a first embodiment of the present invention.

FIG. 1 shows an outline configuration of an image forming apparatus 1 that is capable of forming color images, that applies a first embodiment of the present invention.

The image forming apparatus 1 is a photocopier, but may also be a facsimile, printer, a multi-function device that includes a copier and a printer, or another image forming device. If the image forming apparatus 1 is used as a printer or facsimile, image forming processes are carried out based on image signals corresponding to image information received from outside. Also, besides normal sheets used for general copying and the like, image forming can be carried out on recording media S such as OHP sheets, thick sheets such as card, postcards, or envelopes and the like.

As shown in the figure, the image forming apparatus 1 uses a tandem structure in which a plurality of photoconductive drums (also sometimes simply referred to as "photoconductive members") 1A, 2A, 3A, 4A are disposed. The plurality of photoconductive drums 1A, 2A, 3A, 4A are image carriers on which single color images can be formed in yellow, cyan, magenta, and black, corresponding to the colors when each color is decomposed. Visible images of mutually different colors formed on each photoconductive drum 1A, 2A, 3A, 4A are transferred in superposition onto transfer sheets S that are the recording medium transported by a transfer belt 5. The transfer belt 5 is a movable intermediate transfer member in opposition to each photoconductive drum 1A, 2A, 3A, 4A.

The image forming process is explained using the single photoconductive drum 1A and the adjoining configuration as representative. The other photoconductive drums 2A through 4A have a similar configuration. Therefore for convenience the reference numerals corresponding to the reference numerals applied to the photoconductive drum 1A and the adjoining configuration are applied to the photoconductive drums 2A through 4A and their adjoining configuration, and the detailed explanation is omitted as appropriate.

A charging device 1B that uniformly charges the surface of the photoconductive drum 1A, a light scanning device 20 that uses laser light from a laser light source, a developing device 1D, and a cleaning device BE are disposed around the periphery of the photoconductive drum 1A in the rotation direction indicated by the arrow symbol, to carry out the image forming process. The light scanning device 20 is explained in detail in FIG. 2 and subsequent figures.

A series of developing devices 1D through 4D can supply yellow, cyan, magenta, and black toner in that order from the right side in FIG. 1 of the tension portion of the transfer belt 5. A corona discharge device using discharge wire or a charging roller may be used as the charging device 1B.

The image forming apparatus 1 includes a document reading unit 6 disposed above an image forming unit in which the charging device 1B, the light scanning device 20, the developing device 1D, and the cleaning device 1E are disposed. Image information for documents placed on a document loading platform 6A read by a reading device 7 is output to an image processing control unit that is not shown in the drawings, so that writing information is obtained for the light scanning device 20.

The reading device 7 includes a light source 7A that scans documents placed on the document loading platform 6A, a plurality of reflecting mirrors 7C, and a focusing lens 7D that focuses light reflected from the document to a plurality of CCDs 7B that are provided corresponding to each color separation color. Image information corresponding to the light strength of each color separation color is output from each CCD 7B to the image processing control unit.

The transfer belt 5 is a member made from a dielectric material such as polyester film or the like of thickness about 100 µm, that winds around a plurality of rollers. One of the tension portions of the transfer belt 5 is in opposition to each photoconductive drum 1A through 4A, and transfer devices 8A, 8B, 8C, 8D are disposed to the inside of the transfer belt 5 at positions in opposition to each photoconductive drum 1A through 4A. The thickness of the transfer belt 5 has a tolerance in manufacture of ±10 m, and this can cause positional deviation when superimposing toner images formed in each color as described later. This is mainly solved by a correction by a start position correction member 110 as a color registration error writing slow operation direction deflection means that is described later.

The recording medium S is delivered to the transfer belt 5 from sheet supply cassettes 10A of a sheet supply device 10 via a registration roller 9. The recording medium S is electrostatically held to the transfer belt 5 by corona discharge from the transfer device BA and transported on the transfer belt 5. The transfer devices BA through 8D have the property of electrostatically attracting the images carried on the photoconductive drums 1A through 4A onto the recording medium S.

A recording medium S separation device 11 is disposed at a position to which the recording medium S is transported after image transfer from each photoconductive drum 1A through 4A has been completed. Also, a decharging device 12 is disposed in opposition to and sandwiching the belt at another part of the tension portion. A cleaning device 13 that removes any remaining toner from the transfer belt 5 is shown in FIG. 1.

The separation device 11 neutralizes the electrical charge accumulated on the recording medium S by negative polarity AC corona discharge from the top surface of the recording medium S and removes the electrostatic adhesion of the recording medium S to the transfer belt 5, thereby making it possible to separate the recording sheet S using the curvature of the transfer belt 5, and also prevent the generation of toner dust due to separating discharge. Also, the decharging device 12 neutralizes charge accumulated on both the front and reverse sides of the transfer belt 5 and electrically initializes the transfer belt 5. This is done by carrying out negative polarity AC corona discharge that is the opposite polarity to the charging characteristics of the transfer devices 8A through 8D.

The surface of each photoconductive drum 1A through 4A is uniformly charged by the charging devices 1B through 4B. Electrostatic latent images are formed on the photoconductive drums 1A through 4A using the writing devices 1C through 4C, based on image information for each color separation color read by the reading device 7 in the document reading unit 6. The electrostatic latent images are processed to become visible images with color toner having a complementary color relationship corresponding to the color separation colors supplied from the developing devices 1D through 4D. Then the visible images are electrostatically transferred to the recording medium S that is held and transported on the transfer belt 5, via the transfer devices 8A through 8D.

A decharging device 11 removes the charge from the recording medium S onto which each color separation color image (single color images) carried by each photoconductive drum 1A through 4A has been transferred. The recording medium S is then separated from the transfer belt 5 using the curvature of the transfer belt 5. The recording medium S is then brought to a fixing device 14 in which unfixed toner in the image is fixed. The recording medium S is then discharged to a discharge tray, which is not shown on the drawings, outside the image forming apparatus 1.

Figure 2:
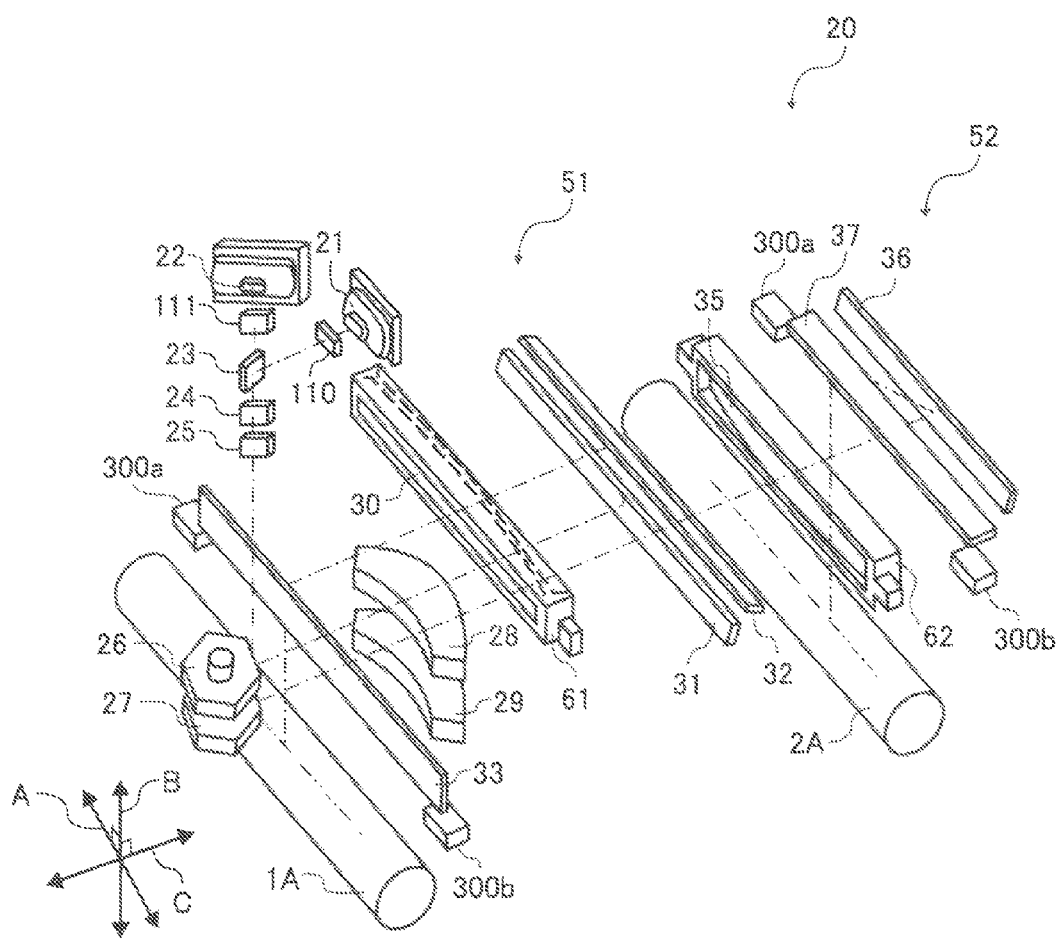
FIG. 2 is a diagram showing the outline configuration of a light scanning device according to the same embodiment.

As shown in FIG. 2, the light scanning device 20 is a tandem type optical writing system using a scanning lens system. However, either a scanning lens or scanning mirror system may be used. Also, in FIG. 2 two stations are shown for convenience of display and the following explanation is based on this. However, four stations may be assumed configured with symmetry to the left and right of polygon mirrors 26, 27 as deflection means. This light scanning device 20 is used in the image forming apparatus 1. The image forming apparatus 1 can form color images as in the present embodiment, so the light scanning device 20 is used to form color images when the image forming apparatus 1 forms color images.

In FIG. 2, the light scanning device 20 has two LD units 21, 22 as light sources. The light scanning device 20 focuses beams of laser light emitted from the LD units 21, 22 to the photoconductive drums 1A, 2A respectively. For this purpose the light scanning device 20 has groups of optical elements 51, 52 formed from a plurality of optical elements corresponding to the LD units 21, 22 and the photoconductive members 1A, 2A respectively. The light scanning device 20 is located to correspond to the photoconductive members 1A, 2A respectively.

The optical element group 51 includes a plurality of optical elements, in other words, a prism (a writing start position correction member 110 that is described later), a bending mirror 23, a cylinder lens 24, the polygon mirror 26, a first scanning lens 28, bending mirrors 31, 32, a second scanning lens 30, and a bending mirror 33. The optical element group 52 includes a plurality of optical elements, in other words, a prism (a writing start position correction member 111 that is described later), a cylinder lens 25, the polygon mirror 27, a first scanning lens 29, a second scanning lens 35, and bending mirrors 36, 37.

Also, the light scanning device 20 includes a holding member 61 and a holding member 62. The holding member 61 holds the second scanning lens 30 from among the optical elements that are included in the optical element group 51.

The holding member 62 holds the second scanning lens 35 from among the optical elements that are included in the optical element group 52. The holding member 61 and the second scanning lens 30 which is the optical element that is held by the holding member 61 has virtually the same configuration as the holding member 62 and the second scanning lens 35 which is the optical element that is held by the holding member 62.

The LD units 21, 22 are set at different heights in the vertical direction, which is the beam sub scanning direction B. The beam emitted from the upper LD unit 21 passes through the writing start position correction member 110, then is bent by the bending mirror 23 to the same direction as the beam emitted from the LD unit 22. The beam emitted from the lower LD unit 22 passes through the writing start position correction member 111 before entering the bending mirror 23, and then passes through the bending mirror 23. Then, the beam from the LD unit 21 and the beam from the LD unit 22 enter the cylinder lenses 24, 25 respectively, and are focused in a line near the reflecting faces of the two-level polygon mirrors 26, 27 which are separated vertically by a predetermined distance.

The LD unit 21 and the LD unit 22 have at least a semiconductor lens and a collimator lens that have been omitted from the drawings. The writing start position correction members 110, 111 are sub scan deflecting means that deflect the position of the laser irradiated onto the photoconductive members 1A, 2A in the sub scanning direction. Their configuration is described in detail later. The polygon mirrors 26, 27 are connected to a polygon motor that is not shown on the drawings, that drives the rotation of the polygon mirrors 26, 27.

After being deflected by the polygon mirrors 26, 27, the beams are shaped by the first scanning lenses 28, 29 that are either integral or superimposed in two layers. Then in the second scanning lens 30, 35 the beam fθ characteristics and the beam spot diameter are formed, and then scanned onto the photoconductive member surface of the photoconductive members 1A, 2A. After the first scanning lenses 28, 29 the beams are led to two different photoconductive members 1A, 2A, so the light paths are different.

The upper beam, in other words the beam that passes through the first scanning lens 28, is deflected 90° upwards by the bending mirror 31. Then after being deflected through 90° by the bending mirror 32, the upper beam enters the upper second scanning lens 30 which is a long plastic lens. Then after being bent vertically downward in the B direction by the bending mirror 33, the upper beam scans the photoconductive member 1A in the main scanning direction A which is the beam scan direction.

The lower beam, in other words the beam that passes through the first scan lens 29, enters the second scan lens 35 which is a long plastic lens, without entering a bending mirror on the way Then the light path is bent by the two bending mirrors 36, 37, and the photoconductive member 2A is scanned in the beam first direction A at a predetermined pitch on the drum. In FIG. 2, the arrow symbol C shows the light axis direction for the second scan lens 30, 35.

Here, beam spot position detection means 300a, 300b is disposed between the photoconductive member 34 and the bending mirror 33, which is the element of the optical element group 51 that is closest to the photoconductive member side. The beam spot position detection means 300a, 300b has the function of position deviation detection means which is sub scan position detection means that detects the sub scan position of the laser irradiated onto the photoconductive members 1A, 2A. Also, beam spot position detection means 300a, 300b is disposed between the photoconductive member 38 and the bending mirror 37, which is the element of the optical element group 52 that is closest to the photoconductive member side.

Figure 3:
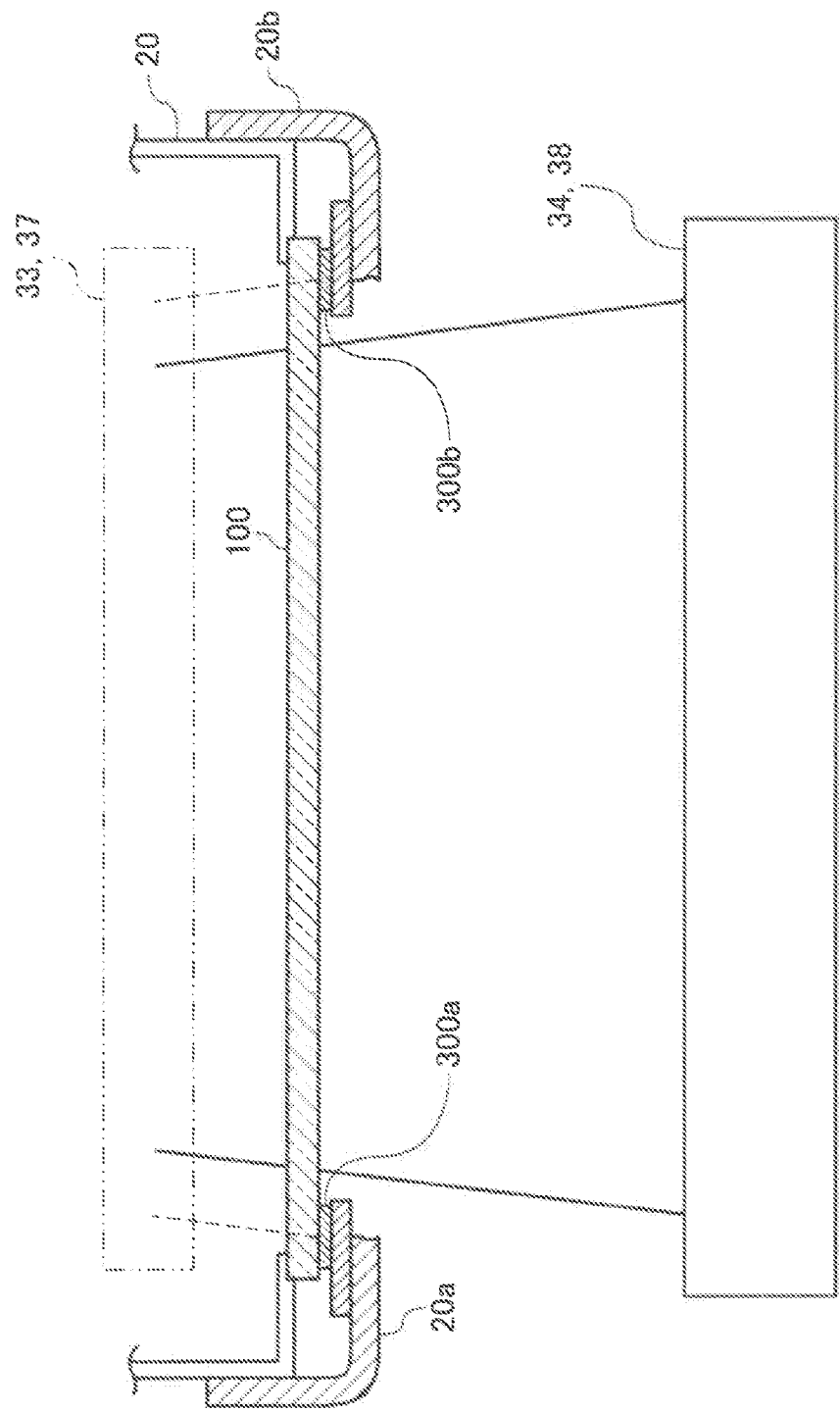
FIG. 3 is a diagram showing the layout of the beam spot position detection means.

FIG. 3 shows the detailed disposition of the beam spot position detection means 300a, 300b. As shown in the figure, the disposition of the beam spot position detection means 300a, 300b is related to the beam position irradiated onto the photoconductive member 1A (or 2A). Therefore the beam spot position detection means 300a, 300b are positioned where the beam position can be measured, making the lenses, reflection mirrors, and all the other optical elements act in common. In other words, the beam spot position detection means 300a, 300b can directly detect the position of the beam irradiated onto the photoconductive member 1A (or 2A) without other intervening optical elements.

In FIG. 3, the beam spot position detection means 300a, 300b are installed integrally with the housing of the light scan device 20 corresponding to the light beam of each color. The beam spot position detection means 300a, 300b are sandwiched between and fixed by connecting brackets 20a, 20b, which are holding members, and dust proof glass 100 through which the beam passes. Also, the beam from the bending mirror 33 or 37 passes through the dust proof glass 100. However, the part of this beam that is in the effective image area is irradiated onto the photoconductive member 34 or 38, and the part of the beam that is outside the effective image area enters the beam spot position detection means 300a, 300b. Therefore the beam spot position detection means 300a, 300b are disposed on the beam scan line. It is considered that the fluctuation in the beam position due to the dustproof glass 100 is virtually zero, so the beam spot position detection means 300a, 300b may be disposed to the bending mirror 33 (or 37) side of the dustproof glass 100.

Also, the beam spot position detection means 300a is for detecting the writing start position, and the beam spot position detection means 300b is for detecting the writing end position. Specifically, the beam spot position detection means 300a is the main scan synchronization detection means and/or the sub scan beam position detection means, that carries out the beam main scan synchronization and/or sub scan detection. Also, the main scan magnification and/or the scan line inclination can be measured by the beam spot position detection means 300b as a light scan device.

The beam scan directions of the other two stations that are not shown in FIG. 2 are symmetrically opposite. Therefore the position detection for write start and write end of the beam spot position detection means 300a, 300b are reversed. In other words, of the four stations, two scan from the left of the image (taking the direction of progress as up), and the remainder scan from the right.

Here, when several images are continuously printed out, the internal temperature of the image forming apparatus 1 fluctuates suddenly. This is due to heat generated within the light scanning device 20 by the polygon motor that drives the polygon mirrors 26, 27 or the LD units 21, 22, or outside the light scan device 20 due to the effect of heat from the heater of the fixing device 14 when fixing, and so on. In this case, the beam spot position on the photoconductive members 1A through 4A also suddenly fluctuates, and the gradually the output color of the color images varies after the first, after several, and after several tens of images have been output.

Therefore the beam spot position detection means 300a, 300b are used as position deviation detection means (beam detection means), and correction is carried out by color registration error correction means, which is described later. The beam spot position detection means 300a, 300b as position deviation detection means includes non-parallel photodiode sensors. The beam spot position detection means 300a, 300b also include the function of detecting the synchronization signal to determine the write start position in the main scanning direction.

As shown in FIG. 4, the light receiving planes of photodiodes PD1 and PD1' intersect the scan beam at right angles, and the light receiving planes of photodiodes PD2 and PD2' is inclined with respect to the light receiving planes of the photodiodes PD1 and PD1' The angle of inclination is $\alpha 1$. Also, if the scan beam before temperature change due to heat from the heater is L1, and the scan beam after the temperature change is L2, the deviation in the sub scanning direction is $\Delta Z$ (unknown). In this case, by measuring the times T1, T2 for a scan beam L1, L2 to pass between a pair of non-parallel photodiodes, in other words, between the non-parallel photodiodes PD1, PD2, or between the non-parallel photodiodes PD1', PD2', and obtaining the time difference T2-T1, the scan position in the slow direction, in other words the writing start position, is monitored and measured.

The angle $\alpha 1$ formed between the light receiving planes of PD1 and PD2, and the time difference T1-T2 are known, so the relative dot positional deviation in the sub scanning direction, in other words the sub scanning direction correction amount $\Delta Z$ can easily be obtained by calculation. This correction amount is corrected by the writing start position correction member 110. Therefore, in cases such as when several images are continuously printed out, even if the beam spot position on the photoconductive members 1A through 4A suddenly vary as a result of temperature variations, it is possible to correct the beam dot position on the photoconductive members 1A through 4A when writing the image data. By knowing the change in the time T0 required for the scan beam to pass between the photodiodes PD1 and PD1, it is also possible to monitor the magnification fluctuation in the main scanning direction. In FIG. 4, beam spot position detection means 300a, 300b using photodiodes have been shown. However, other optical elements that are capable of detecting the beam position may be used, for example, line CCDs may be used.

In this way, by carrying out measurements at two locations in each beam, not only the magnification, but also the end writing position in the main scanning direction when the image carrier is the standard can be measured directly for each beam (regardless of start/end of the scan).

As described above, based on the results of measurements by the beam spot position detection means 300a, 300b, it is possible to correct single color images using several types of color registration error correction means. The details are explained as follows.

<Method of Correcting Sub Scan Registration Color Registration Errors>

In the case of a tandem in which images of each color are formed simultaneously using a single polygon motor, if single color image (registration) adjustment is carried out at the time of writing, adjustment can only be carried out at the scan time interval of one surface of a polygon mirror. Therefore a maximum of one line of color registration error can occur. Also, small changes in position and angle between each optical element occur as a result of heat generated by the polygon motor within the light scan device. Therefore the scan positions in the sub scanning direction on the photoconductive member change, and color registration errors occur. In this way, the change (the relative deviation between the single color images of each color (relative deviation)) in registration between colors due to temperature changes greatly, which can cause deterioration of the image.

Figure 5:
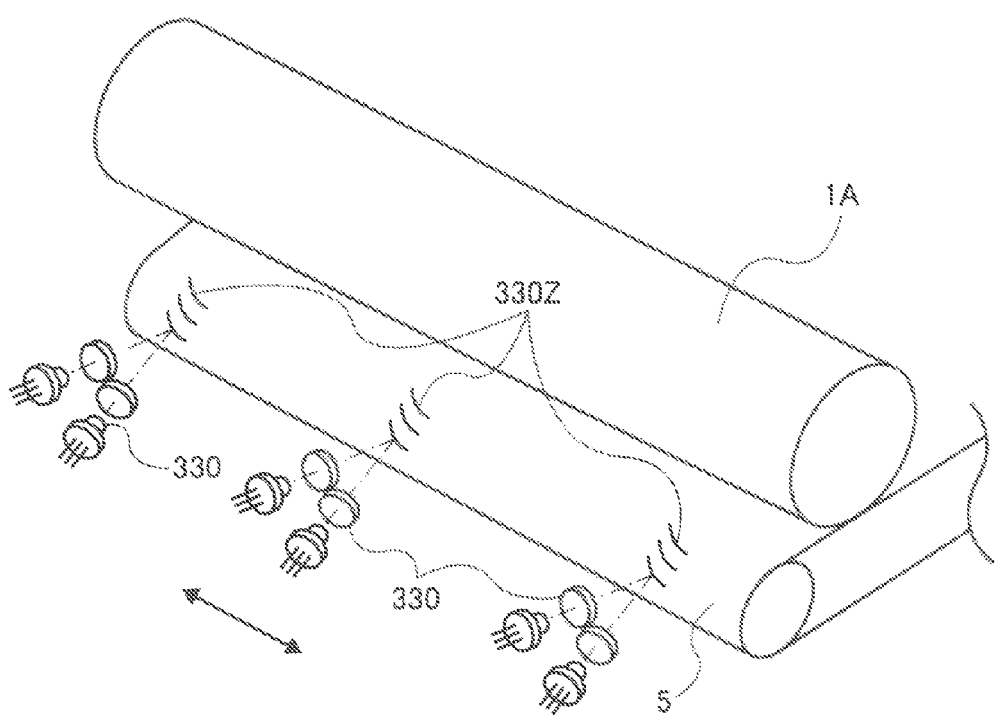
FIG. 5 is an isometric diagram showing the layout of color registration error detection means.

As the method of correcting color registration errors, a detection mode is set every predetermined number of prints. When in the detection mode beams are emitted from the LD units 21, 22 to form toner images for detecting color registration errors. In this way, as shown in FIG. 5, toner images 330Z for detecting color registration errors are formed on the transfer belt 5 in three locations. Then using these toner images which are detection patterns, color registration errors are detected by a color registration error detection means 330 as a pattern detection means.

This correction method detects and corrects color registration errors caused by small changes in the position and size of each image forming unit itself and the position and size of components within the image forming units, due to changes in the temperature within the image forming unit or external applied forces. However, to reliably calculate the amount of the color registration errors, measuring several patterns and taking the average requires a certain amount of time, and toner is wastefully consumed. Therefore, at present the frequency of the detection mode cannot be set to execute every print, so for example the detection mode is set to execute about every 200 prints.

Figure 6:
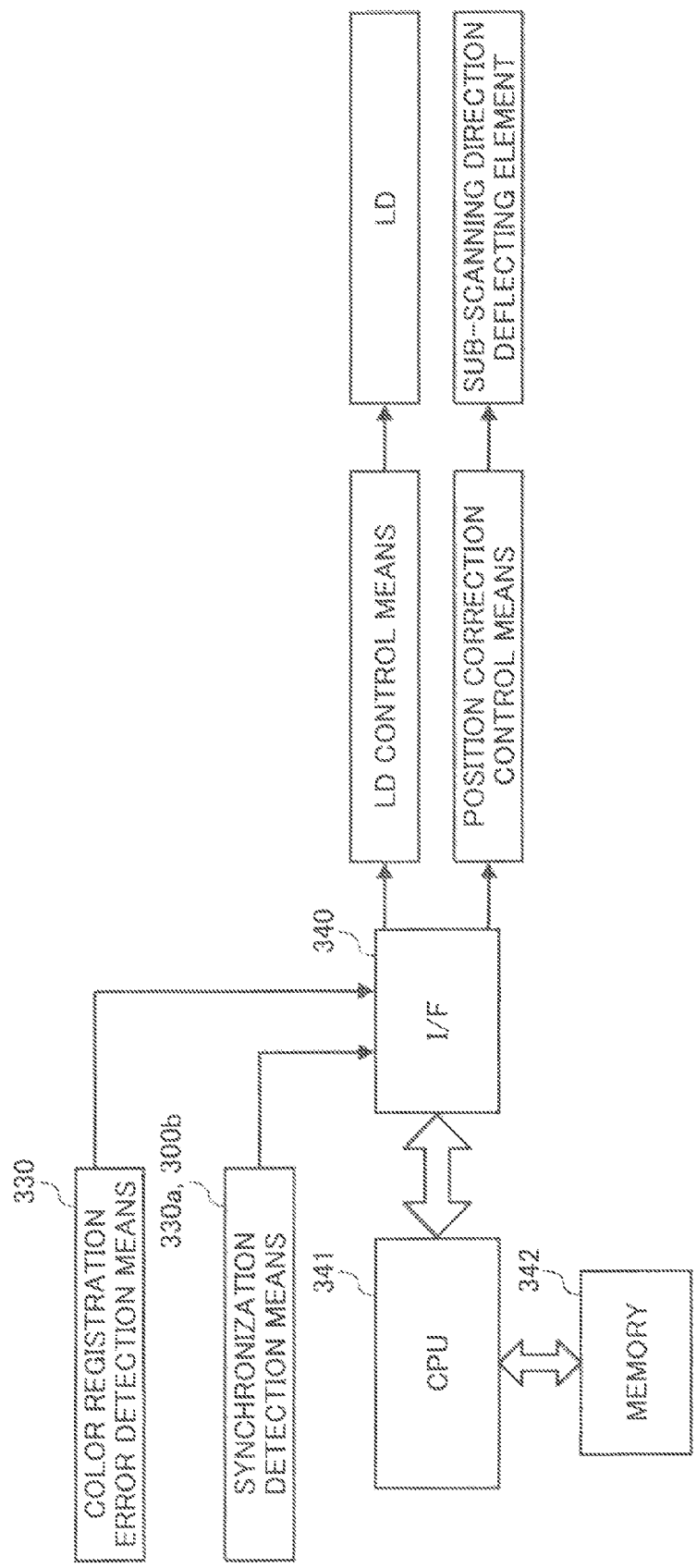
FIG. 6 is a block diagram showing the configuration of the control means that corrects color registration errors of each color image.

FIG. 6 shows the configuration of the control means for carrying out this color registration error correction. In FIG. 6 the detection signal from the color registration error detection means 330 during the detection mode and the detection signal when the beam spot position detection means 300a, 300b is used as synchronization detection means are input to a CPU 341 via an interface I/F 340. The color registration error correction values obtained from the signals are stored in memory means 342. Then when forming images, in other words when printing, the writing is corrected based on the color registration error correction values stored in the memory 342. The method of correction is explained in detail later.

However, with this correction method, at the timing of executing the detection mode it is not possible to correct for image deterioration due to gradual deviation of registration between colors as a result of changes in the environment with time caused by heat generation of the polygon motor or similar.

Figure 7:
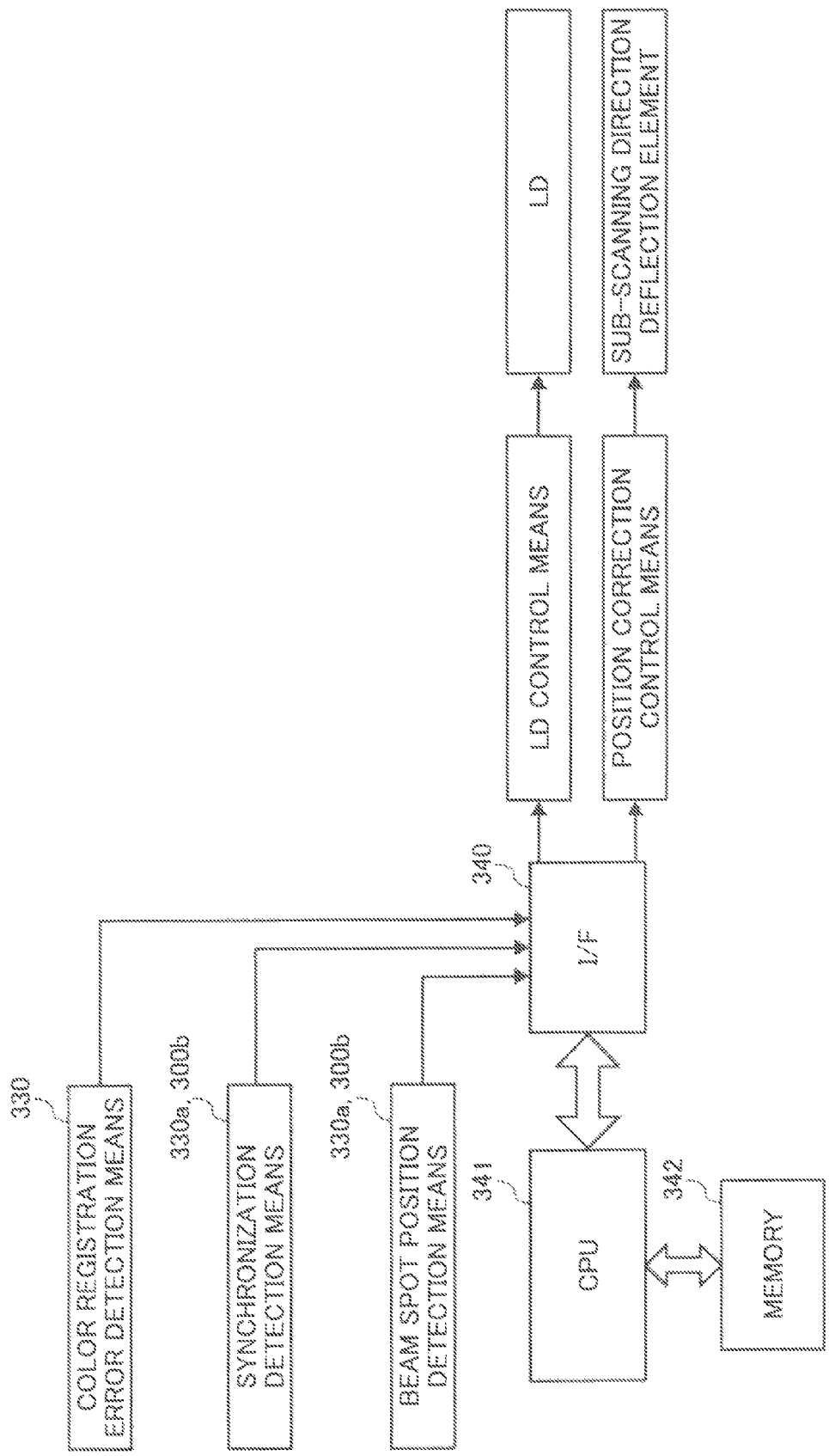
FIG. 7 is a block diagram showing the configuration of the control means that corrects with high accuracy color registration errors of each color image.

Therefore, in the present embodiment, as exemplified by the control means shown in FIG. 7, by disposing the beam spot position detection means 300a, 300b as sub scan beam position detection sensors in the beam emission position, the beam emitted from the light scan device can be reliably detected. Also, by controlling the beam in the sub scanning direction using various changing deflection elements, correction of color registration errors is carried out as time passes.

Figure 8A:
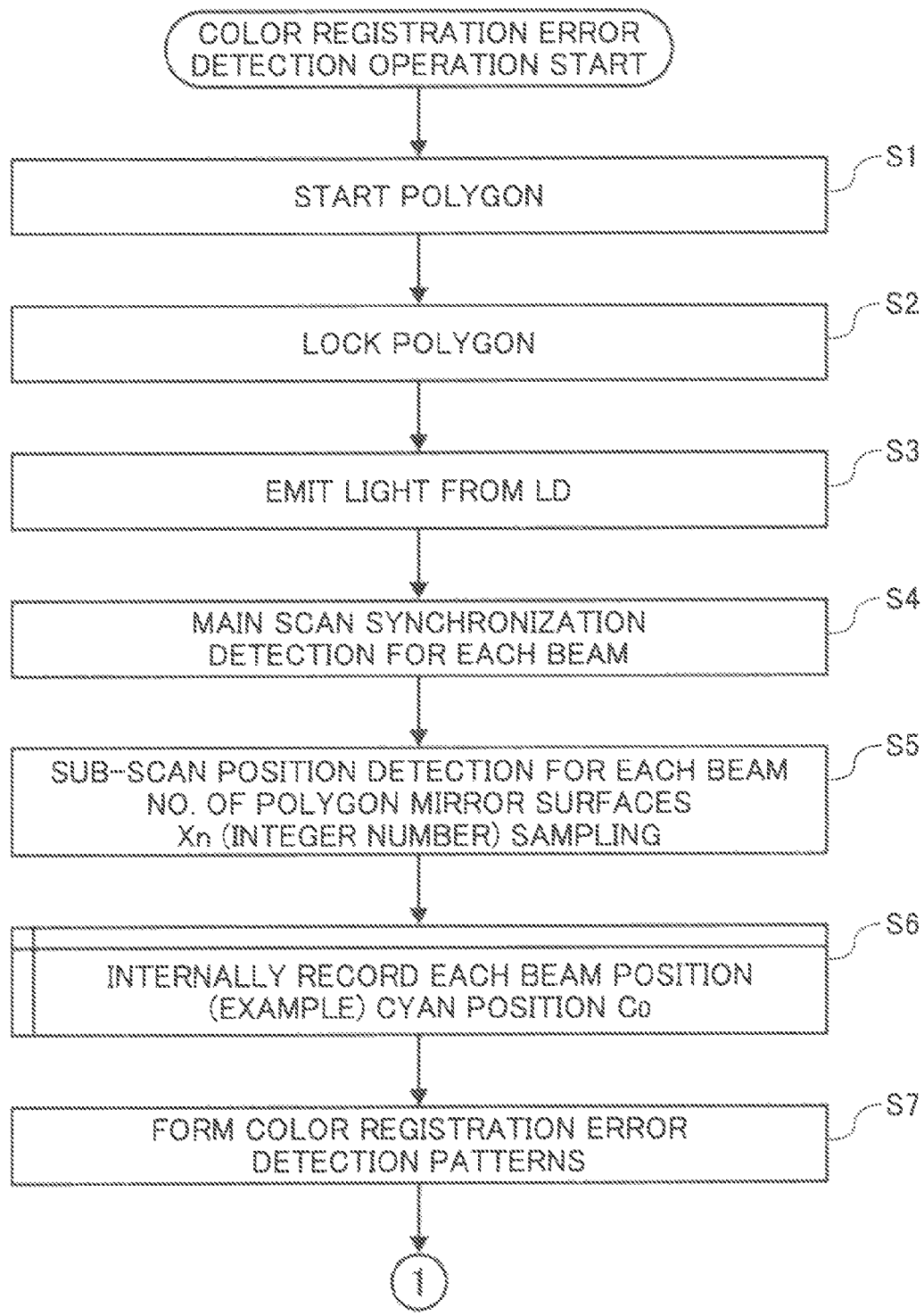
FIG. 8 is a flowchart showing the procedure to calculate the color registration error correction values in the relative deviation correction in the sub scanning direction of each color image.
Figure 8B:
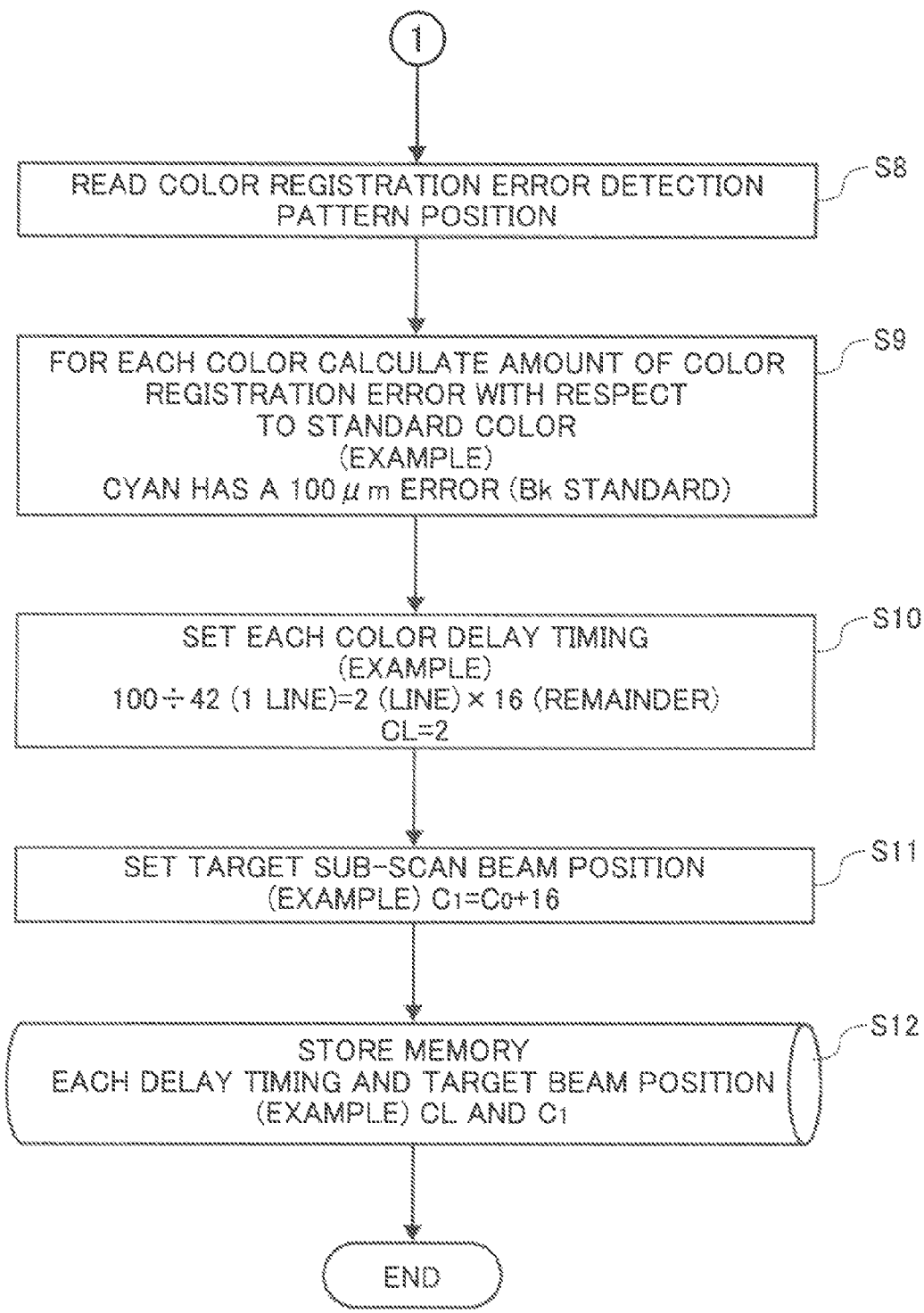

FIG. 8 is a flowchart showing the color registration error detection process.

In FIG. 8, the polygon is rotated (S1), and when the rotation is stable (S2) the LD emits light (S3). Then, after detecting synchronization of the main scan of each beam (S4), the beam position in the sub scanning direction is measured and stored (S5, S6) by the beam spot position detection means 300a or the sensors of the beam spot position detection means 300a, 300b. At this time the number of measurements should be the number of polygon mirror surfaces (in one revolution)×n (an integer) in order to accurately measure the average position. This is because the optical face tangle errors differ within one revolution of the polygon mirror, and precisely small changes occur in each face, also there is variation in the readings of the sensors.

Next, the color registration error detection patterns are formed and measured, and the beam position in the sub scanning direction for each color and the color registration error patterns are read (S7, S8). Then the correction values for color registration errors of each color with respect to the standard color are calculated (S9). In detail, the beam position and time for the single color image of the standard color (for example, black) are taken to be the standard. Then for each color (the colors other than the standard color, in this case yellow, cyan, and magenta) the set values of the write timing delay time and the beam position in the sub scanning direction of the writing unit are calculated and stored in the memory 342. The set value of the beam position in the sub scanning direction is a value obtained by adding a correction value of the calculated color registration error that is one line or smaller to the value of the measured sub scan beam position. These values are stored in the memory 342 (S10, S11, S12).

Figure 9A:
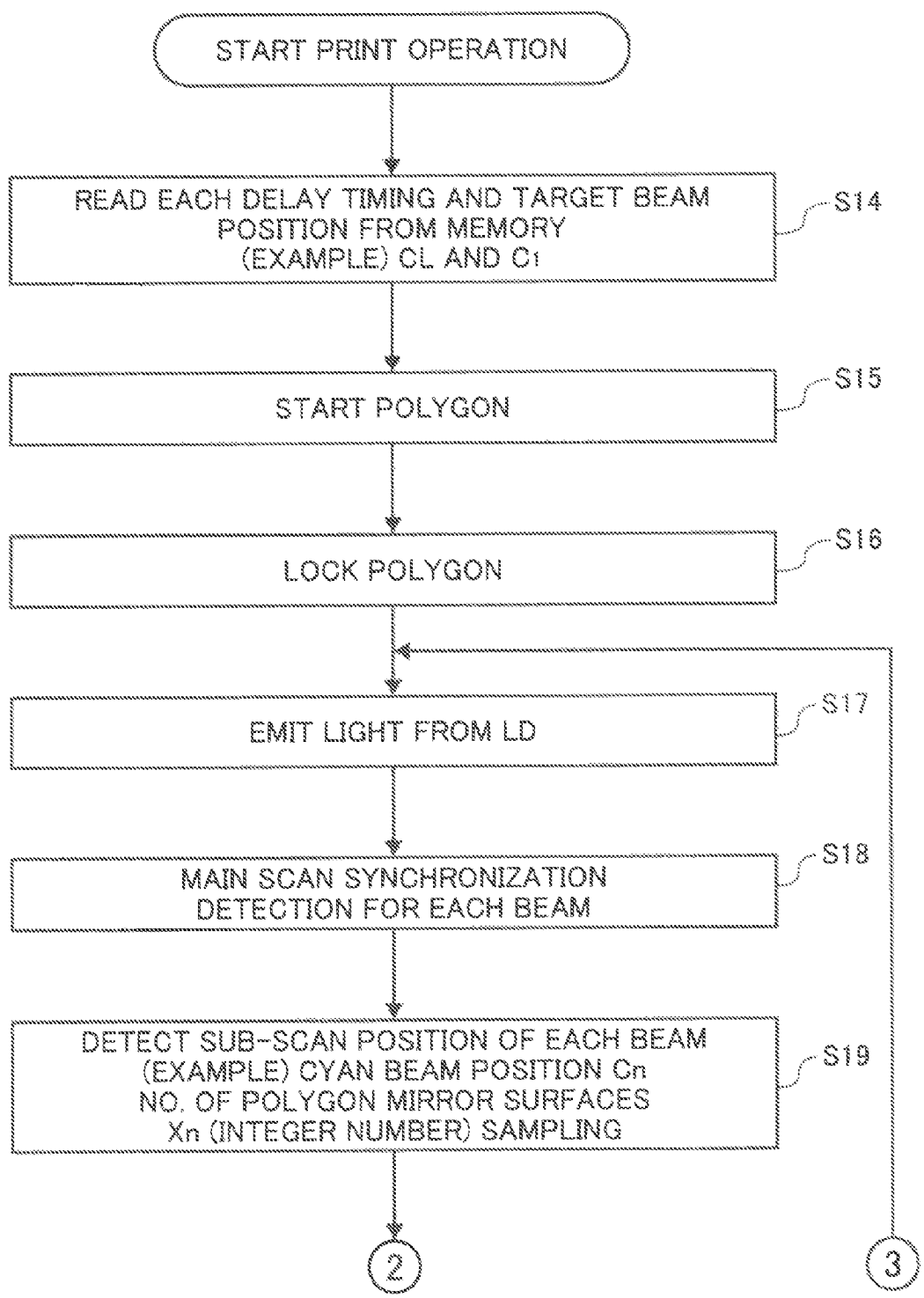
FIG. 9 is a flowchart showing the procedure after the start of the print operation of the relative deviation correction in the sub scanning direction of single color images for each color.
Figure 9B:
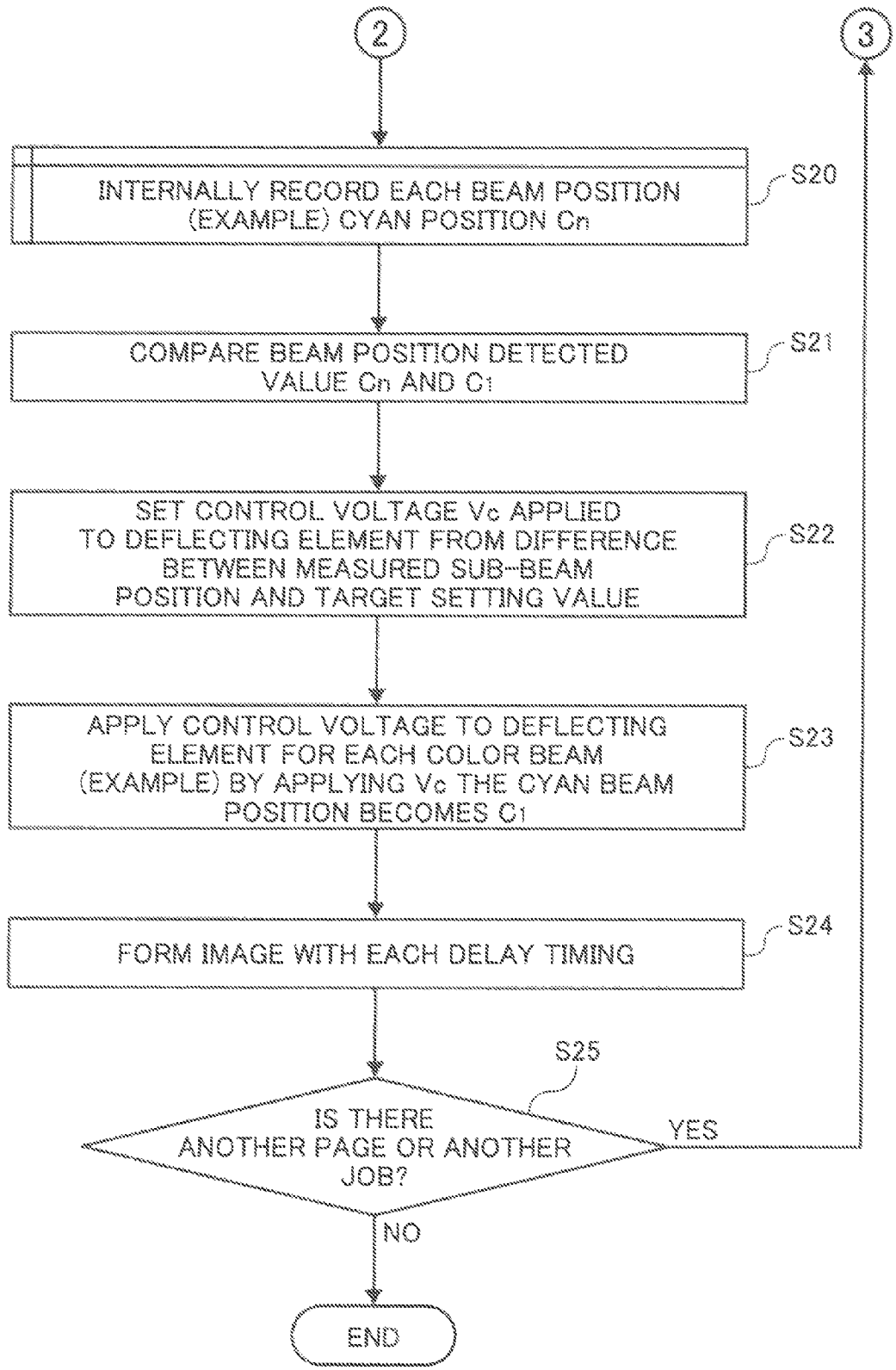

Thereafter, as shown in FIG. 9, during normal print operations the sub scan beam position of the light scan device 20 is measured (S14 to S19) and compared with the set value of the sub scan beam position stored in the memory 342 (S20, S21). Then the sub scan beam position is corrected to coincide with the position of the set value by the start position correction members 110, 111 (S22, S23, S24).

The relative deviation correction amount in the sub scanning direction of the single color images may be calculated based on the measured results for either of the beam spot position detection means 300*a*, 300*b*. However, the correction amount may also be calculated from the average of the positional deviation amounts measured by both beam spot position detection means 300*a*, 300*b*.

Figure 10:
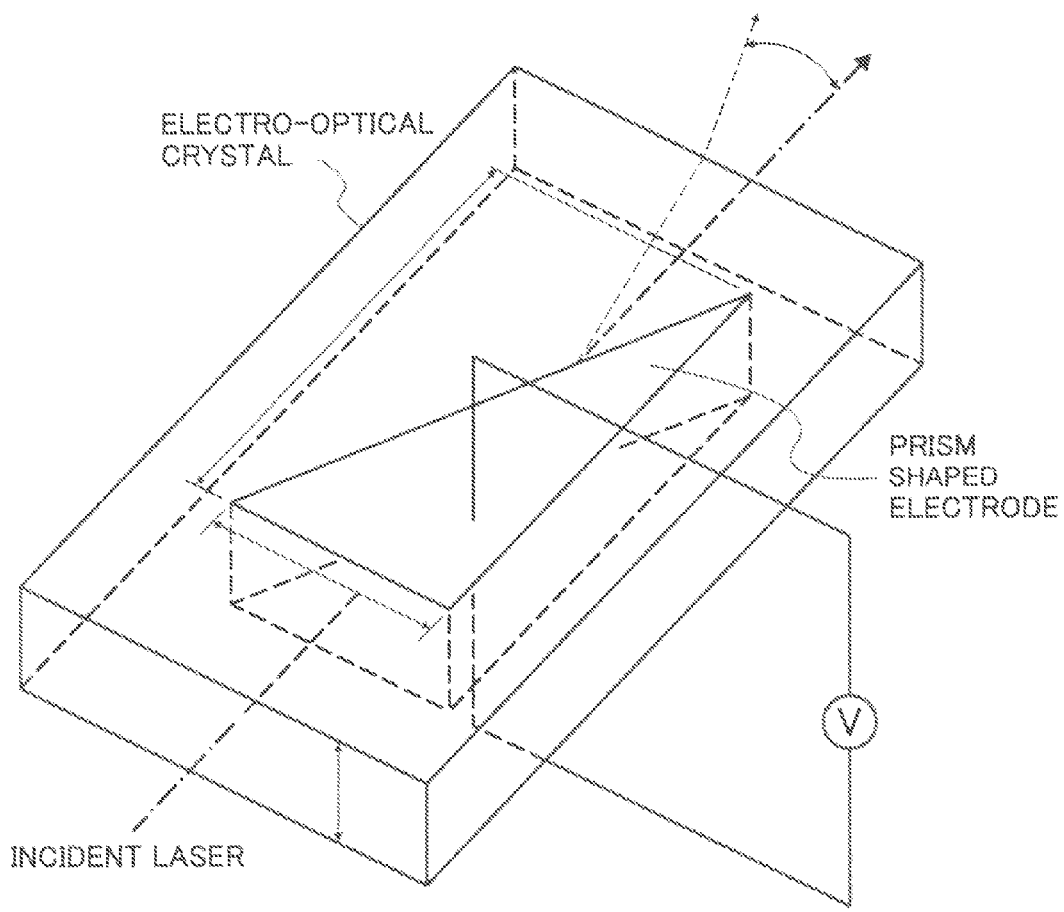
FIG. 10 is an isometric view showing the configuration of the color registration error correction means formed from electro-optical elements.
Figure 11:
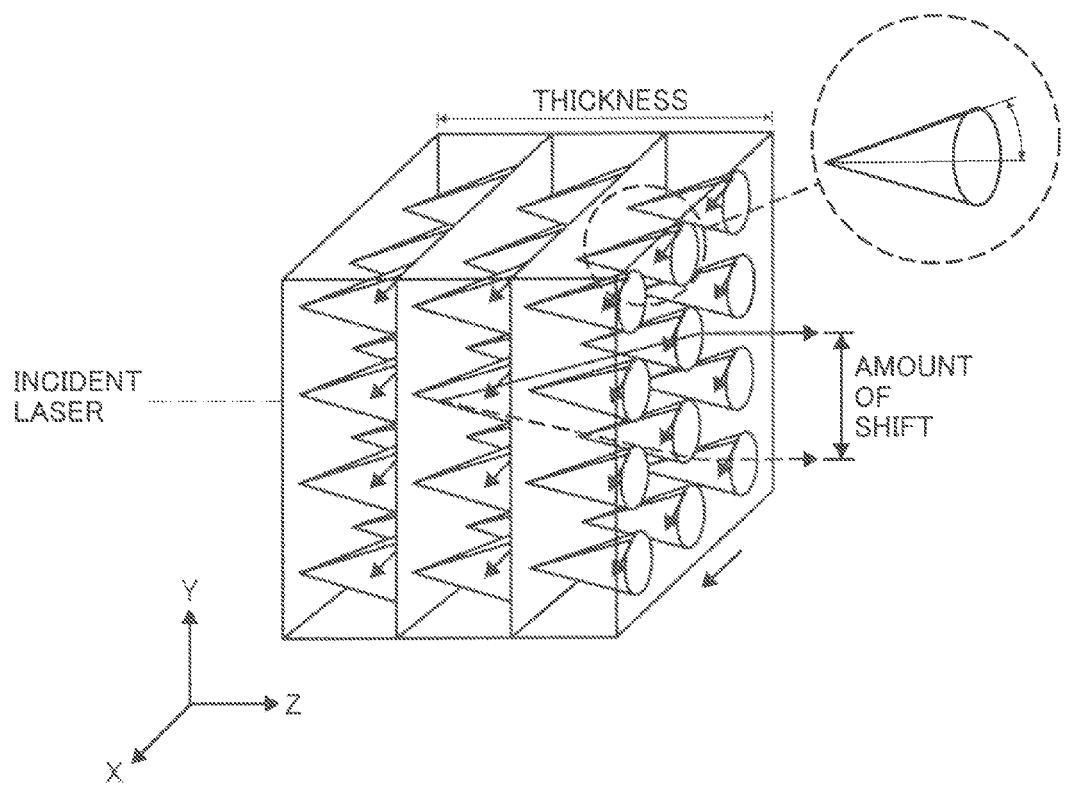
FIG. 11 is an isometric view showing the configuration of the color registration error correction means formed from liquid crystal optical elements.

Commonly known electro-optical elements such as those shown in FIG. 10 or liquid crystal optical elements as shown in FIG. 11 maybe used as the start position correction members 110, 111. Also, although not shown on the drawings, the beam irradiation position may be corrected using acousto-optical elements. In the case of the electro-optical element shown in FIG. 10, $LiNbO_3$, PLZT, or other strong dialectric materials have an electro-optic effect (EO effect), and when an electric field is applied to their crystals or ceramics a change in their refractive index occurs. As deflection elements their response is faster than acousto-optical elements, so prism shaped deflection members using the EO effect may be used.

Also, in the case of the liquid crystal optical element shown in FIG. 11, in strongly dialectric liquid crystals the liquid crystal molecules are aligned in layers. Under no electric field each liquid crystal molecule rotates spirally in the direction of the long axis between layers, in what is known as the spiral structure. By taking the direction of the electric field to be one of the in-plane directions of the liquid crystal layers (in this case the +X direction), the ends of each of the liquid crystal molecules in the figure become automatically polarized in the direction of the electric field as shown by the arrow symbols. As a result the spiral structure of the liquid crystal molecules is broken, and each liquid crystal molecule is oriented in the same direction. This direction is perpendicular to the electric field, in a direction inclined to the direction of the spiral axis by a tilt angle based on the liquid crystal material properties. In this liquid crystal molecule state, if the electric field vector is in the Y direction, and a straight line polarized light beam is shone through the liquid crystals in the positive Z-axis direction, the light axis of the incident light is tilted. In other words, depending on the tilt of the liquid crystal molecules, the light path is shifted in accordance with the liquid crystal layer thickness and the ordinary light and extraordinary light diffraction indices of the liquid crystal molecules. Furthermore, if the electric field direction is reversed from this state, the liquid crystal molecules rotate along the outer peripheral surface of the spirals, taking a position with axial symmetry from the spiral axis, and the direction of shift of the light path is reversed in a direction with axial symmetry. Therefore, by switching the electric field direction, the light path shift can be controlled, and the beam can be deflected in the sub scanning direction.

In order that the start position correction members 110, 111 can correct by small deflection amounts, it is desirable that the start position correction members 110, 111 be disposed close to the LD units 21, 22.

<Correction of Inclination>

Figure 12:
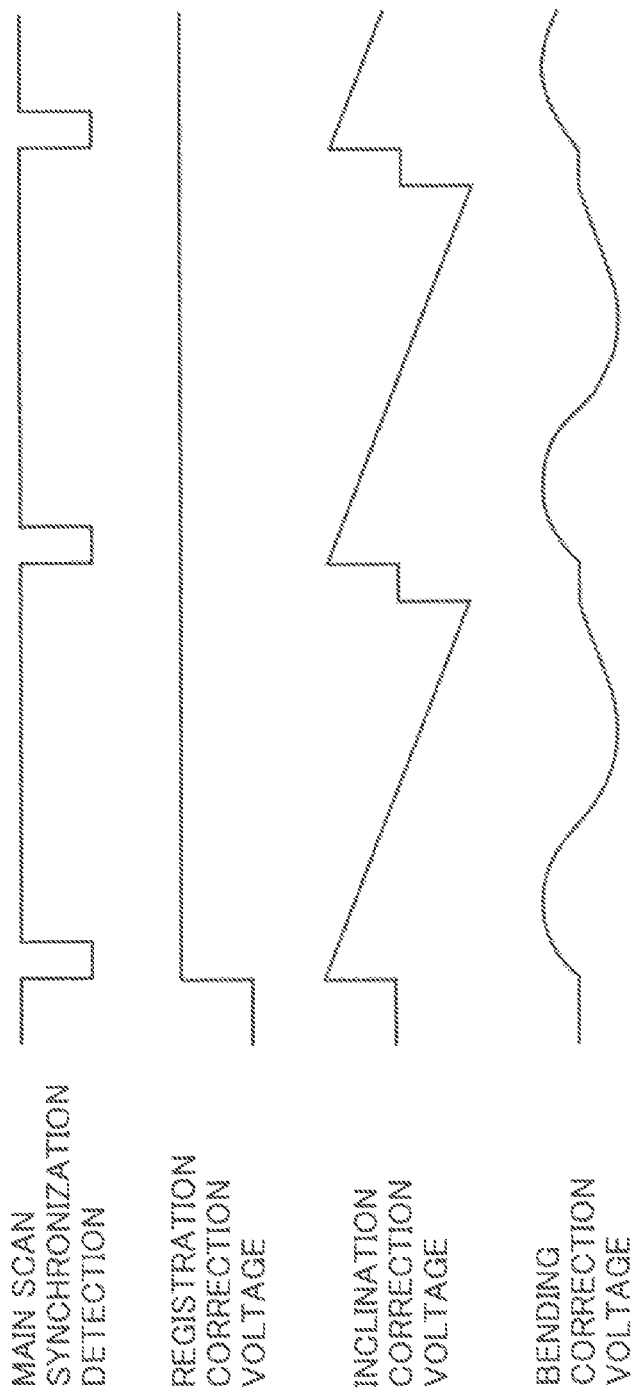
FIG. 12 is a diagram showing the voltage pattern applied to the deflecting element that corrects the inclination and bending of image scan lines.

The inclination of the scan lines for each color fluctuates depending on the installation state of the device as a whole or the environmental temperature, and so on, and this results in color registration errors. The method of correction includes creating the color registration error detection patterns on the intermediate transfer belt in several rows (a minimum of two rows), then measuring the color registration errors corresponding to their position due to inclination between colors by a plurality of reading photo sensors. In this case also, the amount of inclination is calculated with respect to the standard color, and the voltage to be applied to the deflecting elements that correct this inclination is stored in memory for each color. This voltage wave form is a voltage that varies during one line scan, as shown in FIG. 12, and using the main scan synchronization detection signal as a trigger, and repeatedly providing the signal to the deflecting element, the inclination is corrected.

Also, as stated previously, before creating the color registration error detection patterns, the scan start and end beam positions in the sub scanning directions of the beam emitted from the writing unit are measured by the sensors 300*a* and 300*b*. Then using the amount of inclination measured from the color registration error detection patterns by the reading photo sensors as correction values, the scan start and end target beam positions are calculated, and stored in memory. In a normal print operation, the correction voltage shown in FIG. 12 is applied to each deflecting element using the synchronization detection signal as a trigger, in order to achieve this target beam position. In the case of this method, it is possible to respond to fluctuations in inclination due to variations in temperature within the device or environmental fluctuations, during continuous printing.

<Bending Correction>

Cost reduction is required for the scanning optical system described above, so inevitably plastic is adopted, and resin forming is used. In particular, in the tandem type writing unit according to the present embodiment, the number of optical elements is large, so adopting plastic materials has a very large cost reduction effect. Therefore, in the present embodiment also the optical elements referred to above are formed from plastic materials.

However, bending can easily occur in long plastic optical elements due to the forming conditions or residual stresses, or the like, in particular in the main scanning direction A and the direction at right angles to this direction, or direction B. The amount of this bending is several tens of microns, and due to differences in molds there is variation in the amount and direction of the bending. Therefore it was extremely difficult to align with high accuracy the curved or inclined scan lines between each station.

Therefore, the method of correcting bending includes forming the color registration error detection pattern in three or more rows of the intermediate transfer belt, and measuring the amount of bending for each color corresponding to the positions by a plurality of photo sensors. In the case of correcting the amount of bending as a second order curved line, there is no problem with three measurement points as in this example. However, for correcting higher order curvature four or more measurement points are necessary. In this case also, the amount of bending is calculated with respect to the standard color, and the voltage to be applied to the deflecting elements that deflect the beam position in the slow direction is stored in memory for each color. This voltage wave form is a voltage that varies during one line scan, as shown in FIG. 12, and using the main scan synchronization detection signal as a trigger, and repeatedly providing the signal to the deflecting element, the inclination is corrected.

Also, for bending, if there are no fluctuations in the environment or with time, the amount of bending for each color is measured at the time of assembly in the factory, and the applied voltage correction values that correct the bending are input in advance to the memory. Then in normal printing operations the correction voltage in FIG. 12 is applied to each deflecting element using the synchronization detection signal as a trigger, in accordance with the bending correction values stored in memory.

In the above, the correction of scan line registration, scan line inclination, and scan line bending was described separately. However, by adding the correction values and superimposing each correction voltage, it is possible to eliminate color registration errors due to all causes.

According to the first embodiment as described above, the following effects can be obtained.

(1) It is possible to precisely correct color registration errors between colors.

(2) It is possible to monitor and control fluctuations in the laser irradiation position caused by the temperature within the device during continuous operation or heat generated by the writing polygon motor. Therefore the amount of color registration error is stable with time. Also, when the color registration error detection operation was carried out about every 200 prints, normal printing operations were stopped. However, the color registration error detection operation interval can be set to very long intervals.

(3) It is possible to precisely correct color registration errors between colors.

(4) It is possible to make the deflecting elements smaller, and prevent large variations in the image optical properties such as beam diameter or beam strength.

(5) It is possible to control the beam sub scan position within a scan, and correct for color registration errors due to inclination and bending.

(6) The beam irradiation position on the photoconductive member and the corresponding beam position within the writing unit can be measured.

(7) Color registration errors can be corrected at anytime during printing operations by reading and using the correction values from the memory means.

(8) It is possible to follow color registration errors caused by fluctuations in the beam position due to environmental fluctuations or temperature fluctuations within the device, and so on.

(9) It is possible to reduce errors due to beam position fluctuations caused by polygon mirror optical face tangle errors, and measure the precise beam position.

(10) It is possible to correct, for every sheet, fluctuations in the beam position due to heat generated by the polygon motor or the like.

(11) It is possible to correct, for every job, fluctuations in the beam position due to heat generated by the polygon motor or the like.

Second Embodiment

Next, a second embodiment of the present invention is explained. However, FIGS. 1, 2, 10, and 11, and their associated explanation are also applied to the present embodiment in essentially the same manner, so repetition of their explanation has been omitted. In the following only the differences from the first embodiment and the characteristics of the present embodiment are explained.

First, in the present embodiment, as stated later, the optical elements 110 and 111 shown in FIG. 2 function as deflecting elements in the sub scanning direction. These sub scanning direction deflecting elements each move the beam position in the sub scanning direction when a voltage is applied to them.

Figure 13:
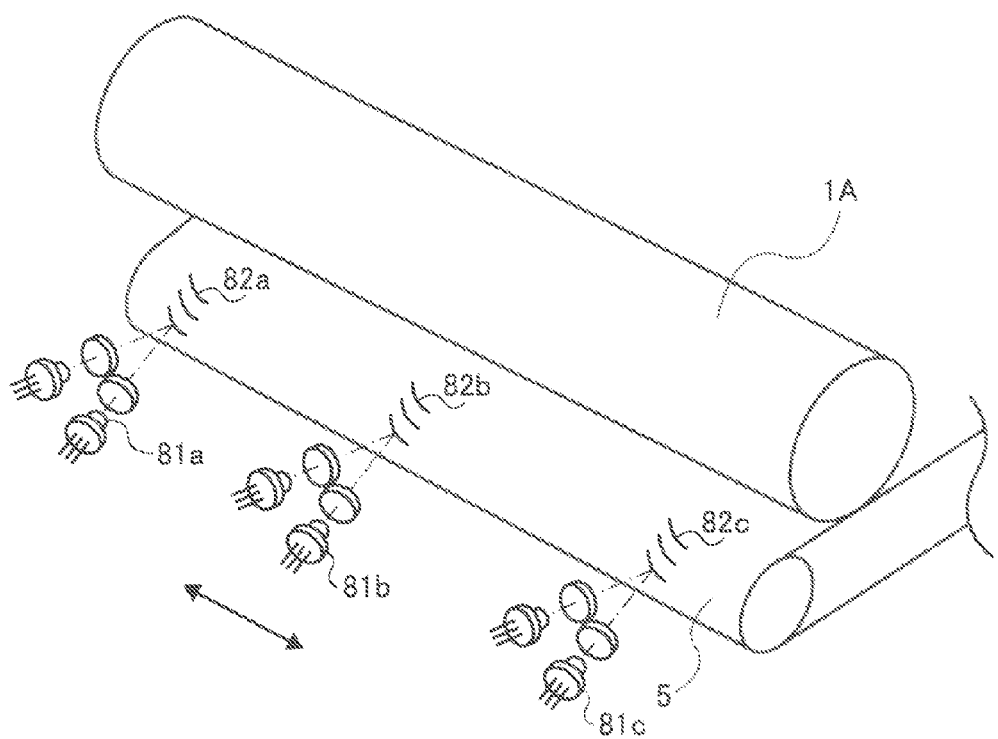
FIG. 13 is an isometric view showing the layout of the position deviation detection means according to a second embodiment of the present invention.

Next, the method of calculating the bending correction value is explained with reference to FIG. 13.

The transfer belt 5 rotates in the counterclockwise direction. Color registration error detection patterns 82a, 82b, 82c formed on the photoconductive drum 1A are transferred to a position on the transfer belt 5 that is between sheets. The bending correction method includes forming the color registration error detection patterns 82a through 82c in three or more rows on the transfer belt 5. Then the amount of bending corresponding to their position is measured for each color by a plurality of reading photo sensors or color registration error pattern detection means 81a, 81b and 81c. Then the amount of bending with respect to a standard scan line, which is described later, is calculated. Then the voltages to be applied to the deflecting elements that deflect the beam position in the sub scanning direction for each color are stored in a memory that is described later.

Figure 14:
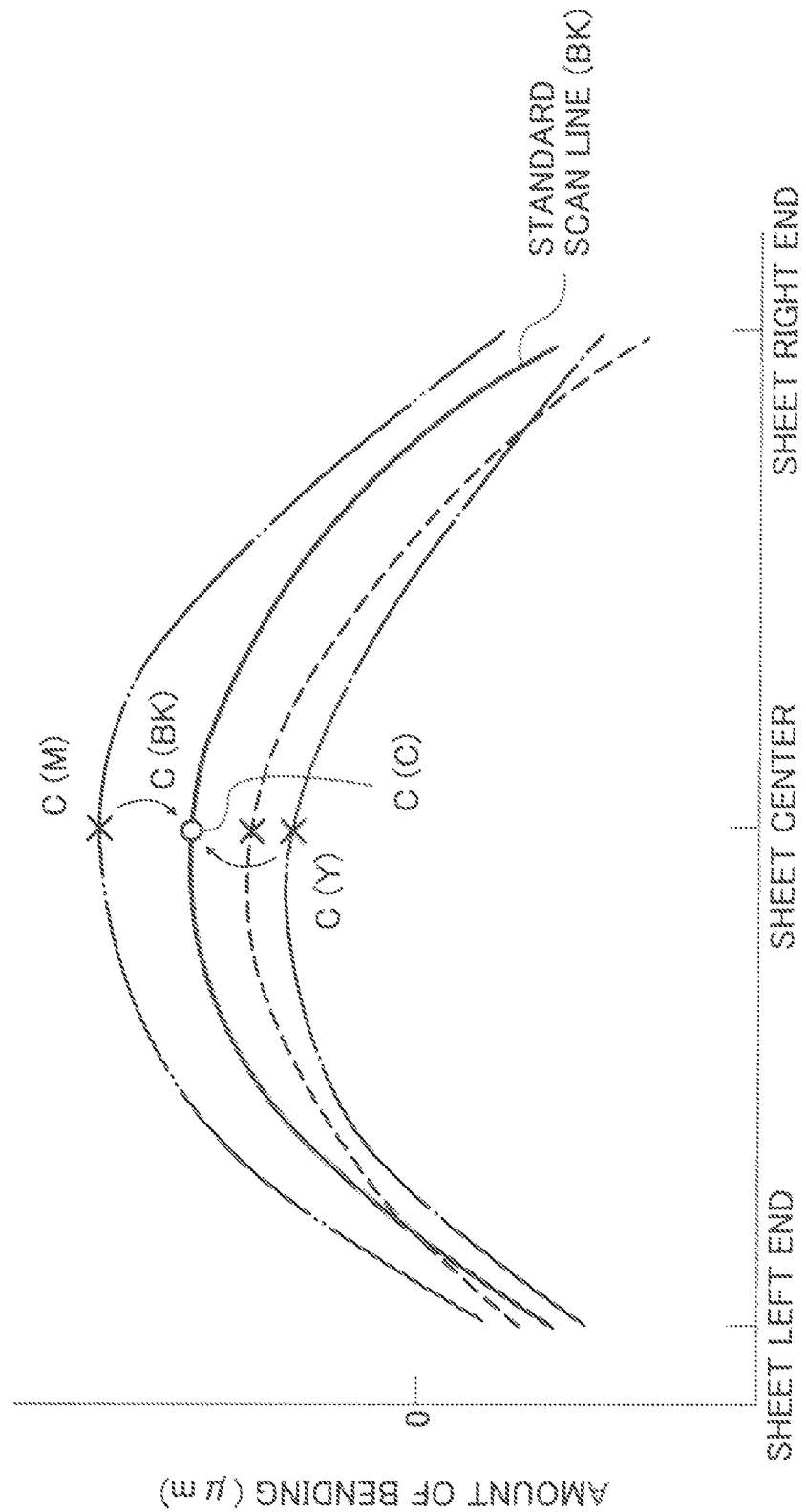
FIG. 14 is a diagram of the curved line approximation for the scan line bending for each color in the same embodiment.

FIG. 14 shows the curved line approximation for the scan line bending measured by the color registration error pattern detection means 81a through 81c from the detection patterns 82a through 82c. In order to more accurately determine the scan line bending, the number of points measured by the color registration error pattern detection means 81a through 81c should be increased.

In FIG. 14, the furthest scan line that passes through the optical element that is furthest from the deflector or the polygon mirrors 26, 27, in other words the lens 35 in FIG. 2, is set as the standard scan line. In the present embodiment the standard scan line is a black scan line. It is expected that the amount of change in the scan line with time is the smallest with this setting, as the lens 35 is not easily affected by the heat from the polygon motor that drives the polygon mirrors 26, 27. Therefore, for example, if the center of the sheet is (C), and the scan line position of each color is yellow, C(Y), magenta, C(M), cyan, C(C), and black, C(BK), then the correction values are set to make C(Y), C(M), and C(C) coincide with C (BK). In the same way, the correction values at the left and right ends of the sheet are also set so that yellow, magenta, and cyan coincide with the black standard scan line.

In this case, by increasing the number of measurement points taken in the sheet width direction, all the scan lines can be aligned with the standard scan line with greater accuracy.

Here, if the standard scan line has sub scan position change means it is possible to reduce the amount of scan line bending to near zero. However, if an amount of bending is permissible for the standard scan line (for example, about 0.2 mm in a sheet width of 300 mm), it does not matter if there is no sub scan position change means.

These correction values are stored in the memory of the image forming device. Then the next time an image is formed the values are read, and by applying signals to the sub scanning direction deflecting elements 110, 111 scan line bending is corrected. The bending correction values do not vary greatly between the faces of the polygon mirrors, so the correction values may be averaged and stored in memory. To reduce the bending even smaller, correction values for each polygon mirror surface may be stored.

Also, in the present embodiment the scan line that passes through the optical element that is furthest from the polygon mirrors 26, 27, in other words the lens 35 in FIG. 2, was taken to be the standard scan line. However, taking into consideration reducing the amount of correction, of the four scan lines, the scan line for which the correction deviation for the other three scan lines is smallest may be set as the standard scan line.

With this type of setting, of the four scan lines, the scan line that is nearest to the center line between the lines with most and least bending is taken to be the standard. Therefore, this is desirable if there is a scan line near the center line. However, if the scan line is deviated away from the center line, the effect will be small even if the correction deviations are smaller.

Figure 15:
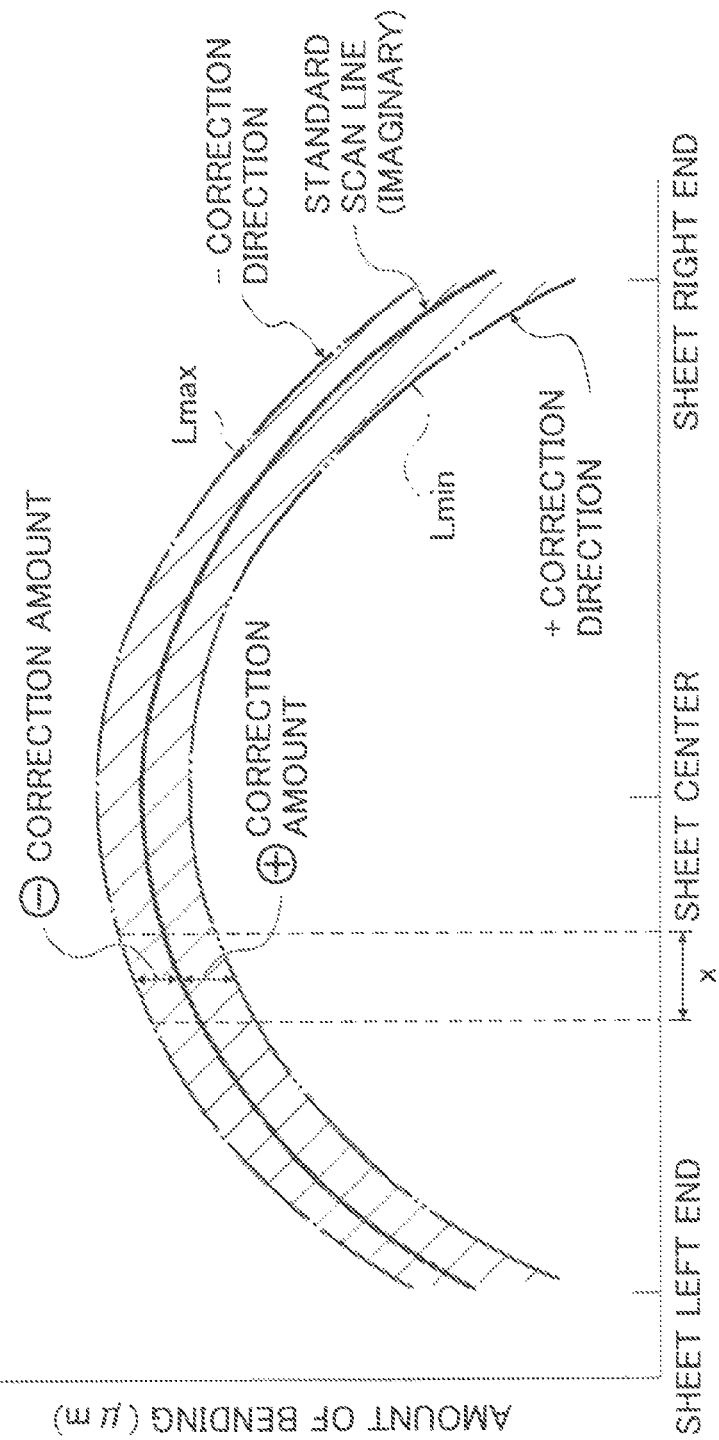
FIG. 15 is a diagram of the curved line approximation for the scan line bending for each color in another example of the same embodiment.

FIG. 15 shows the curved line approximation for the scan line bending measured by the color registration error pattern detection means 81a through 81c from the detection patterns 82a through 82c. For example, if L(max) and L(min) are the maximum value and the minimum value of the bending for the curved line approximations of the scan lines, an imaginary center line between these lines may be set as the standard scan line. The amount of correction with respect to this scan line is the initial value for each scan line. The values are stored in the memory as the correction values over an interval of length X in the direction of the width of the sheet. This imaginary standard scan line is a center line between the maximum value L(max) and the minimum value L(min), so the maximum amount of correction is at most half the amount for the maximum value L(max) or the minimum value L(min). Also, when next forming an image, scan line bending can be corrected by reading these values and applying them as a signal to the sub scanning direction deflecting elements 110, 111.

Figure 16:
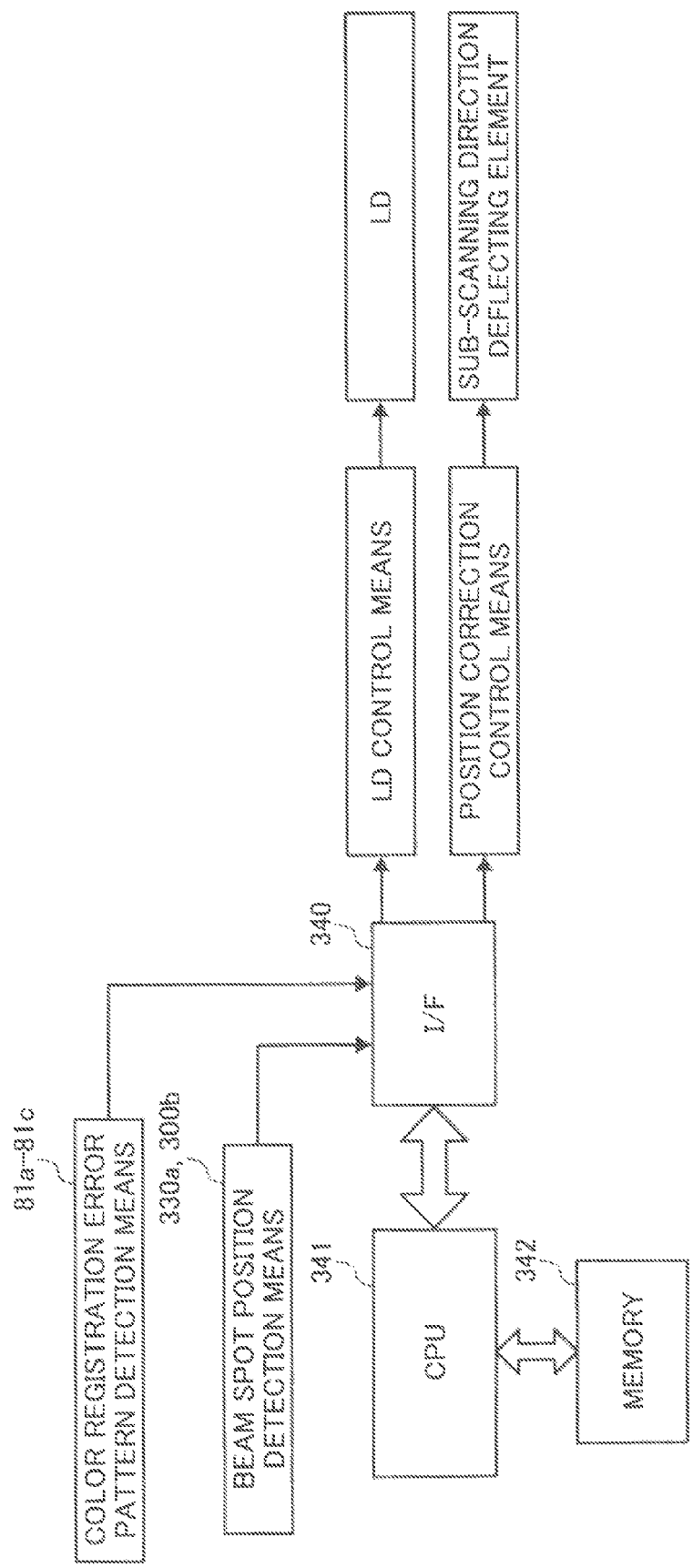
FIG. 16 is a block diagram showing the configuration of the control means that corrects the color registration errors for each color image.

Next, the control means according to the present embodiment is explained with reference to FIG. 16.

The control means sets the correction value from the positional deviation, and stored and calls it up from memory. When in detection mode, the color registration error pattern detection means 81a through 81c measures the beam position for each color. Then the correction values are calculated using a curved line approximation to the bent shape, and stored in memory 342 via interfaces I/F 340, 341.

When forming an image, the data stored in the memory 342 is called up, and the CPU 341 and the LD control means control the LD unit to emit a laser beam. The beam position is measured by a plurality of beam position detection sensors 300, 301, the correction values for the straight line approximation to the curved lines are calculated, and stored in the memory 342 via the I/F 340 and CPU 341. When image forming again, the correction values are called up from memory 342, the bending correction values are converted into a signal by the control means, and transmitted to the sub scanning direction deflecting elements 110, 111.

Figure 17:
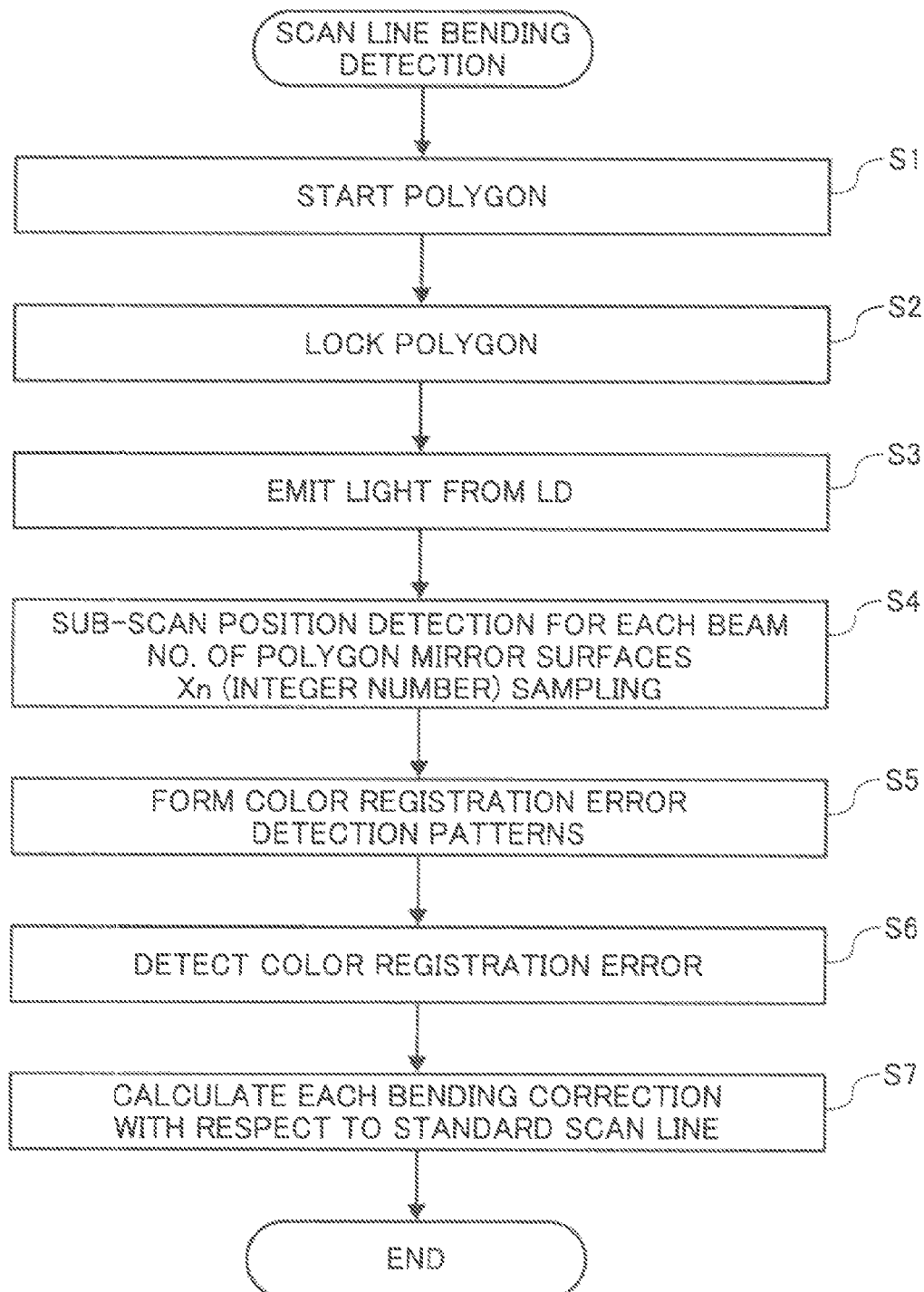
FIG. 17 is a flowchart showing the procedure for calculation of correction values for correcting scan line bending of each color image.

FIG. 17 is a flowchart showing the scan line bending correction control.

In FIG. 17, polygon rotation is started (S1), and when the rotation is stable (S2), the LD emits light (S3). Then the beam position in the sub scanning direction is measured by the sensors of the beam spot position detection means 300a, or the sensors of the beam spot position detection means 300a, 300b (S4). At this time the number of measurements should be the number of polygon mirror surfaces (one revolution)×n (an integer) in order to accurately measure an average position. This is because the optical face tangle errors differ within one revolution of the polygon mirror, and precisely small changes occur in each surface, also there is variation in the readings of the sensors.

Next, the color registration error detection patterns are formed, and the beam positions in the sub scanning direction for each measured color and the color registration error pattern is read (S5, S6). The bending correction value with respect to the standard scan line is calculated for each color (S7) and stored in the memory 342.

When printing, the writing position is corrected by making the scan lines for each color coincide with the standard scan line based on the bending correction values stored in the memory, via the sub scanning direction deflecting elements 110, 111.

However, printing is temporarily stopped for the detection mode, so the detection mode cannot be frequently carried out. For example, the detection mode can be executed every 200 prints. However, the lenses are affected by the temperature rise of the polygon motor due to temporary continuous operation, and there is sufficient likelihood of changes to the scan line bending. At this time, the scan line bending data cannot be rewritten, and if images are formed image quality reduction due to color registration errors will be seen.

Figure 18:
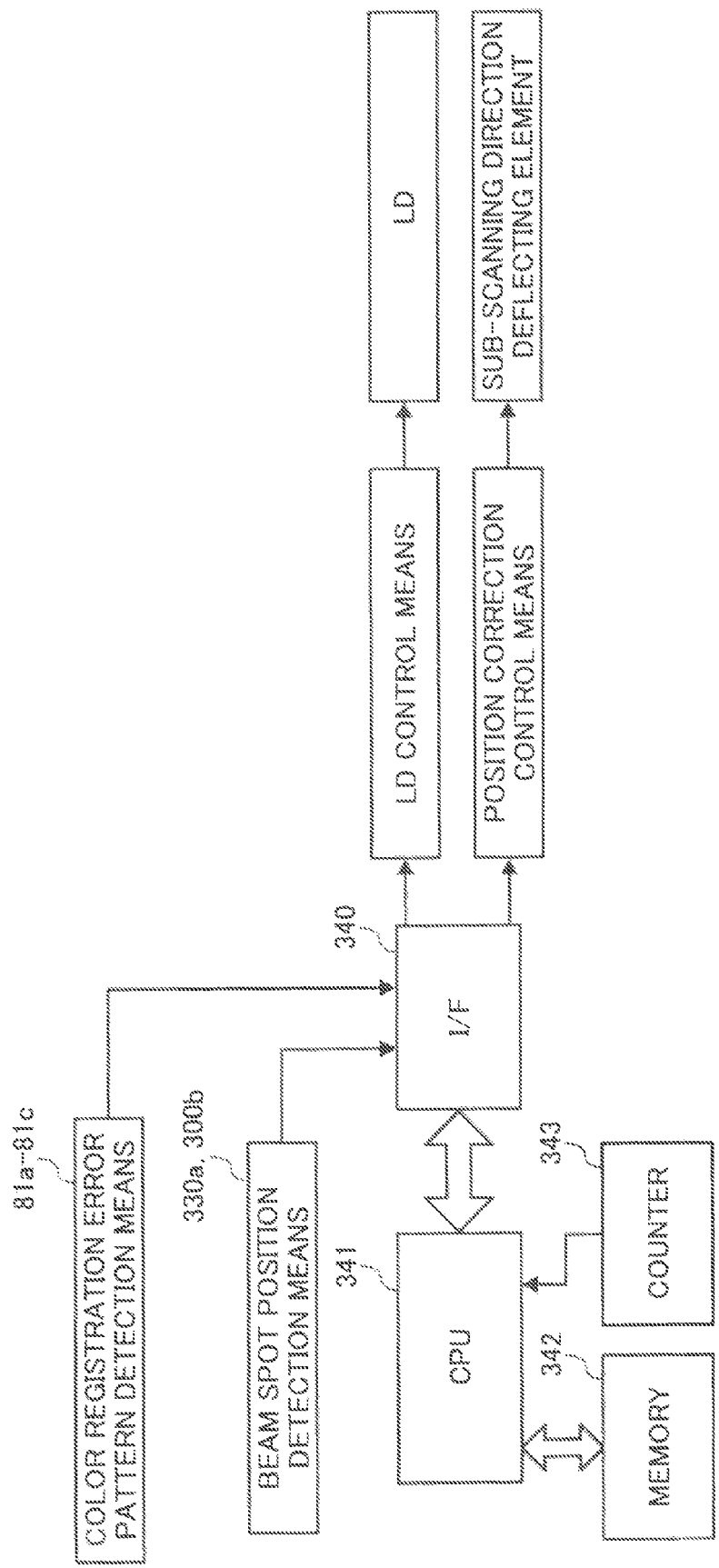
FIG. 18 is a block diagram showing the configuration of the control means that corrects color registration errors according to another example of an embodiment.

Therefore, in the control procedure shown in FIG. 18, a counter 343 is provided that reads the number of rotations of the polygon motor, time, and so on. Then the data read by the counter 343 is sent to the CPU 341, and the number of revolutions, time, and soon, are added. Also, after a certain period of time has passed, a value Z divided by the time is stored in the CPU. When this value Z reaches or exceeds a certain fixed value Y (for example, a value by which scan line bending increases due to temperature rises) (Z=Y or Z>Y), the detection mode is executed and the data in the memory 342 is rewritten.

By this configuration, if the temperature rise due to continuous operation is equal to or greater than a predetermined temperature, even if the amount of scan line bending fluctuates as a result, the fluctuations can be followed and the bending correction values for each color with respect to the standard scan line can be rewritten. Therefore it is possible to reduce color registration errors due to temporary temperature rises. When it is determined from the number of revolutions of the polygon mirror that the temperature has returned to the predetermined temperature or lower, the detection mode may be executed and the data in memory 342 may be rewritten. However, it is also possible to execute a control to restore the data that was in the memory 342 before the temperature rise. In this case color registration errors can be reduced without increasing the number of detection modes.

In this control means it is considered that the temperature has risen above the predetermined temperature from the number of revolutions of the motor. However, more simply temperature sensors or the like may be installed near the lenses 30, 35, and when the temperature exceeds a predetermined temperature, for example 45° C., the detection mode is executed, and the data in the memory 342 is rewritten.

If the bending does not fluctuate with changes in the environment or with time, the amount of bending for each color may be measured at the time of assembly in the factory, and the applied voltage correction values that correct the bending maybe input in advance to the memory. Then in normal printing operations the correction voltages in accordance with the correction values stored in the memory are applied to each deflecting element, triggered by the synchronization detection signal of the synchronization sensors 300a, 300b in FIG. 2.

As stated above, the correction of scan line bending has been described, but by adding each separate correction value, and superimposing each separate correction voltage, it is possible to eliminate color registration errors caused by scan line bending.

According to the second embodiment as described above, the following effects can be obtained.

(1) The scan line for the color that passes through the most distant optical element, which is least affected by the heat of the deflecting means, is set as the standard scan line. Therefore the number of bending correction means can be reduced, so it is possible to reduce cost. Also, bending correction for one scan line is unnecessary, so the control is simplified.

(2) The scan line from among the plurality of scan lines, for which the bending deviations are least, in other words the scan line for which the scan line bending is the average for the scan lines, is taken to be the standard scan line. Therefore, it is possible to reduce the amount of bending correction for the other scan lines. Also, bending correction for one scan line is unnecessary, so the control is simplified.

(3) The imaginary center line through the maximum value and the minimum value of all the scan line bending is taken to be standard scan line. Therefore, the amount of bending correction for all the scan lines can be reduced, and the size of the sub scan deflecting means can be reduced.

(4) The size of the sub scan deflecting means can be reduced.

(5) It is possible to correct color registration errors by controlling the beam sub scan position during a scan.

(6) It is possible to correct color registration errors caused by bending, based on periodically rewritten data for the scan line bending correction.

(7) In circumstances in which a temperature rise in the deflecting means is expected, it is possible to correct scan line bending due to the temperature, and obtain good images with no color registration errors.

(8) The temperature near optical elements is monitored, and when the temperature rises scan line bending is corrected with the data for that time. Therefore it is possible to obtain good images with no color registration errors.

(9) When the temperature returns to normal, the normal mode is restored, so it is possible to obtain images with no color registration errors without increasing the number of control modes.

Various modifications will become possible for those skilled in the art after receiving the teachings of the present disclosure without departing from the scope thereof.

What is claimed is:

1. An image forming apparatus, comprising:
a light scanning device configured to direct laser beams emitted from a plurality of laser light sources onto a plurality of photoconductive members via a focusing device and a deflecting device that deflects the beams in a main scanning direction;
an image forming device that forms visible images from images written onto the photoconductive members by the light scanning device;
an intermediate transfer member or a recording sheet transport member capable of carrying the visible images formed on the photoconductive members;
a sub scan deflecting device that deflects a position of the laser beams irradiated onto the photoconductive members in a sub scanning direction;
a sub scan position detection device that detects the sub scan position of the laser beams irradiated onto the photoconductive members;
a pattern detection device that detects a pattern formed on the intermediate transfer member or the recording sheet transport member by the image forming device;
a memory device that stores a target irradiation position obtained by correcting color registration errors with respect to the laser irradiation position detected by the sub scan position detection device and color registration error correction values obtained from a detection output of the pattern detection device; and
a control device that controls the correction of color registration errors between each color, wherein
the control device stores the target irradiation position detected by the sub scan position detection device in the memory device, and when in a detection mode, forms a pattern on the intermediate transfer member or the recording sheet transport member by the image forming device, detects the pattern by the pattern detection device, and stores the color registration error correction values obtained from the detection output of the pattern detection device in the memory device, and when forming images, the control device reads the color registration error correction values and the target irradiation position stored in the memory device, and carries out control so that the laser irradiation position after correction in accordance with the correction values is the target irradiation position.

2. The image forming apparatus as claimed in claim 1, wherein the control device delays the light emission timing of laser diodes with respect to the calculated color registration error correction values, and corrects an integer multiple of scan intervals, and a correction amount of less than one scan interval is corrected by the sub scan deflecting device.

3. The image forming apparatus as claimed in claim 1, wherein the sub scan deflecting device is disposed upstream in a laser irradiation direction of the deflecting device that deflects the beams in the main scanning direction.

4. The image forming apparatus as claimed in claim 1, wherein the sub scan deflecting device has a deflecting element comprising an electro-optical element.

5. The image forming apparatus as claimed in claim 1, wherein the sub scan deflecting device has a deflecting element comprising a liquid crystal optical element.

6. The image forming apparatus as claimed in claim 1, wherein the sub scan deflecting device has a deflecting element comprising an acousto-optical element.

7. The image forming apparatus as claimed in claim 1, wherein the sub scan position detection device is disposed after, in a direction of irradiation of the laser beam, all the optical elements that direct the laser beam to the photoconductive member and within the light scanning device.

8. The image forming apparatus as claimed in claim 1, wherein when executing the detection mode, the control device detects the beam position in the sub scanning direction for each beam via the sub scan position detection device, and after calculating the color registration error correction values, calculates the target irradiation position in the sub scanning direction and stores a value thereof in the memory device.

9. The image forming apparatus as claimed in claim 1, wherein during normal image forming, the control device detects the beam position in the sub scanning direction of each beam before forming a latent image via the sub scan detection device that detects the laser irradiation position in the sub scanning direction, reads the stored target sub scanning direction beam position, compares the stored value with a measured value, and controls a deflecting element that deflects the beams in the sub scanning direction to achieve the target irradiation position.

10. The image forming apparatus as claimed in claim 1, wherein a number of measurements of the beam position in the sub scanning direction for each beam by the sub scan position detection device is the number of polygon mirror surfaces (one revolution)×n (an integer), and an average value thereof is taken to be a detection result.

11. The image forming apparatus as claimed in claim 1, wherein in an interval between forming each image during normal image forming, the control device detects the beam position in the sub scanning direction of each beam via the sub scan detection device that detects the laser irradiation position in the sub scanning direction, reads the stored target sub scanning direction beam position, compares the stored value with a measured value, and controls a deflecting element that deflects the beams in the sub scanning direction to achieve the target beam position.

12. The image forming apparatus as claimed in claim 1, wherein in an interval between each job during normal image forming, the control device detects the beam position in the sub scanning direction of each beam via the sub scan detection device that detects the laser irradiation position in the sub scanning direction, reads the stored target sub scanning direction beam position, compares the stored value with a measured value, and controls a deflecting element that deflects the beams in the sub scanning direction to achieve the target beam position.

13. An image forming apparatus, comprising:
- a light scanning device to direct laser beams emitted from a plurality of laser light sources onto a plurality of photoconductive members via a focusing device and a deflecting device to deflect the beams in a main scanning direction;
- an image forming device to form visible images from images written onto the photoconductive members by the light scanning device;
- an intermediate transfer member or a recording sheet transport member capable of carrying the visible images formed on the photoconductive members;
- a sub scan deflecting device to deflect a position of the laser beams irradiated onto the photoconductive members in a sub scanning direction;
- a sub scan position detection device to detect the sub scan position of the laser beams irradiated onto the photoconductive members;
- a pattern detection device to detect a pattern formed on the intermediate transfer member or the recording sheet transport member by the image forming device;
- a memory device to store a target irradiation position obtained by correcting color registration errors with respect to the laser irradiation position detected by the sub scan position detection device and color registration error correction values obtained from a detection output of the pattern detection device; and
- a control device configured to control the correction of color registration errors between each color, wherein
- the control device stores the target irradiation position detected by the sub scan position detection device in the memory device, and when in a detection mode, forms a pattern on the intermediate transfer member or the recording sheet transport member by the image forming device, detects the pattern by the pattern detection device, and stores the color registration error correction values obtained from the detection output of the pattern detection device in the memory device, and when forming images, the control device reads the color registration error correction values and the target irradiation position stored in the memory device, and carries out control so that the laser irradiation position after correction in accordance with the correction values is the target irradiation position.

* * * * *